US012566647B2

(12) United States Patent
Singh et al.

(10) Patent No.: US 12,566,647 B2
(45) Date of Patent: Mar. 3, 2026

(54) SYSTEM AND METHOD FOR IMPLEMENTING MICRO-APPLICATION ENVIRONMENTS

(71) Applicant: The Toronto-Dominion Bank, Toronto (CA)

(72) Inventors: Jagjot Singh, North Bethesda, MD (US); Mathurangan Arulananthan, Toronto (CA); Mark Amar Mezher Falzon, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 464 days.

(21) Appl. No.: 17/935,221

(22) Filed: Sep. 26, 2022

(65) Prior Publication Data

US 2024/0103939 A1    Mar. 28, 2024

(51) Int. Cl.
*G06F 9/54* (2006.01)
*G06F 9/445* (2018.01)

(52) U.S. Cl.
CPC .......... *G06F 9/542* (2013.01); *G06F 9/44526* (2013.01)

(58) Field of Classification Search
None
See application file for complete search history.

(56) References Cited

U.S. PATENT DOCUMENTS

| | | | |
|---|---|---|---|
| 10,230,571 B2 | 3/2019 | Rangasamy et al. | |
| 11,012,400 B1 | 5/2021 | Xu et al. | |
| 11,132,179 B1 | 9/2021 | Chu et al. | |
| 11,368,373 B2 | 6/2022 | Singh | |
| 2009/0199218 A1* | 8/2009 | Goring | H04L 67/34 719/328 |
| 2012/0322550 A1* | 12/2012 | Antkowiak | G06F 16/95 463/29 |
| 2019/0188010 A1* | 6/2019 | Stockert | G06F 8/71 |
| 2020/0226615 A1* | 7/2020 | Gaur | G06F 9/541 |
| 2022/0116345 A1* | 4/2022 | Xu | H04L 67/141 |

\* cited by examiner

*Primary Examiner* — Umut Onat
(74) *Attorney, Agent, or Firm* — CPST Intellectual Property Inc.; Brett J. Slaney; Amy Scouten

(57) ABSTRACT

A system, method, and computer readable medium for implementing micro-application environments is disclosed. The exemplary method includes providing a browser container ("browser"), and providing at least one micro-application for operating within the browser. The method includes providing a plug-in for the browser. The plug-in configured to listen to events originating in, or push events to, the at least one micro-application. The method includes storing, via the plug-in, documentation of events that each of the at least one micro-application subscribes to. The method includes determining, via the plug-in, occurrence of a first event, the first event being subscribed to by the at least one micro-application, and in response to determining the occurrence, generating, via the plug-in, a message to the at least one micro-application based on the event. The method includes executing, via the at least one micro-application, a new action in response to receiving the message.

20 Claims, 12 Drawing Sheets

516  Provide a browser container

518  Provide at least one micro-application for operating within the browser container 520  Provide a plug-in for the browser container, the plug-in configured to listen to events originating in, or push events to, the at least one micro-application 522  Store, via the plug-in, documentation of events that are subscribed to 524  Determine, via the plug-in, occurrence of a first event 526  In response to determining the occurrence of the first event, generate, via the plug-in, a message based on the event 528  Execute a new action in response to receiving the message

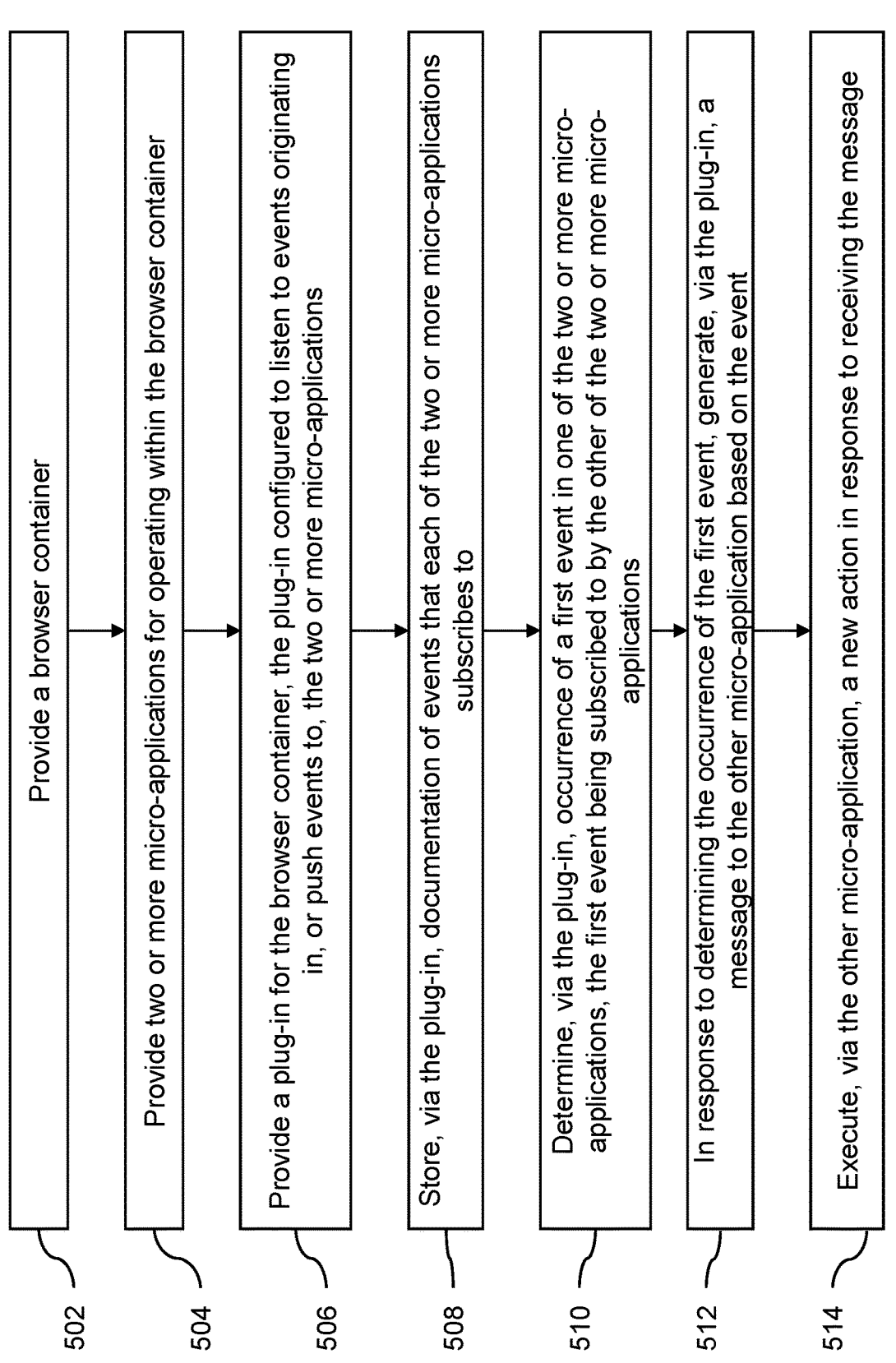

502 Provide a browser container

504 Provide two or more micro-applications for operating within the browser container 506 Provide a plug-in for the browser container, the plug-in configured to listen to events originating in, or push events to, the two or more micro-applications 508 Store, via the plug-in, documentation of events that each of the two or more micro-applications subscribes to 510 Determine, via the plug-in, occurrence of a first event in one of the two or more micro-applications, the first event being subscribed to by the other of the two or more micro-applications 512 In response to determining the occurrence of the first event, generate, via the plug-in, a message to the other micro-application based on the event 514 Execute, via the other micro-application, a new action in response to receiving the message

FIG. 5A

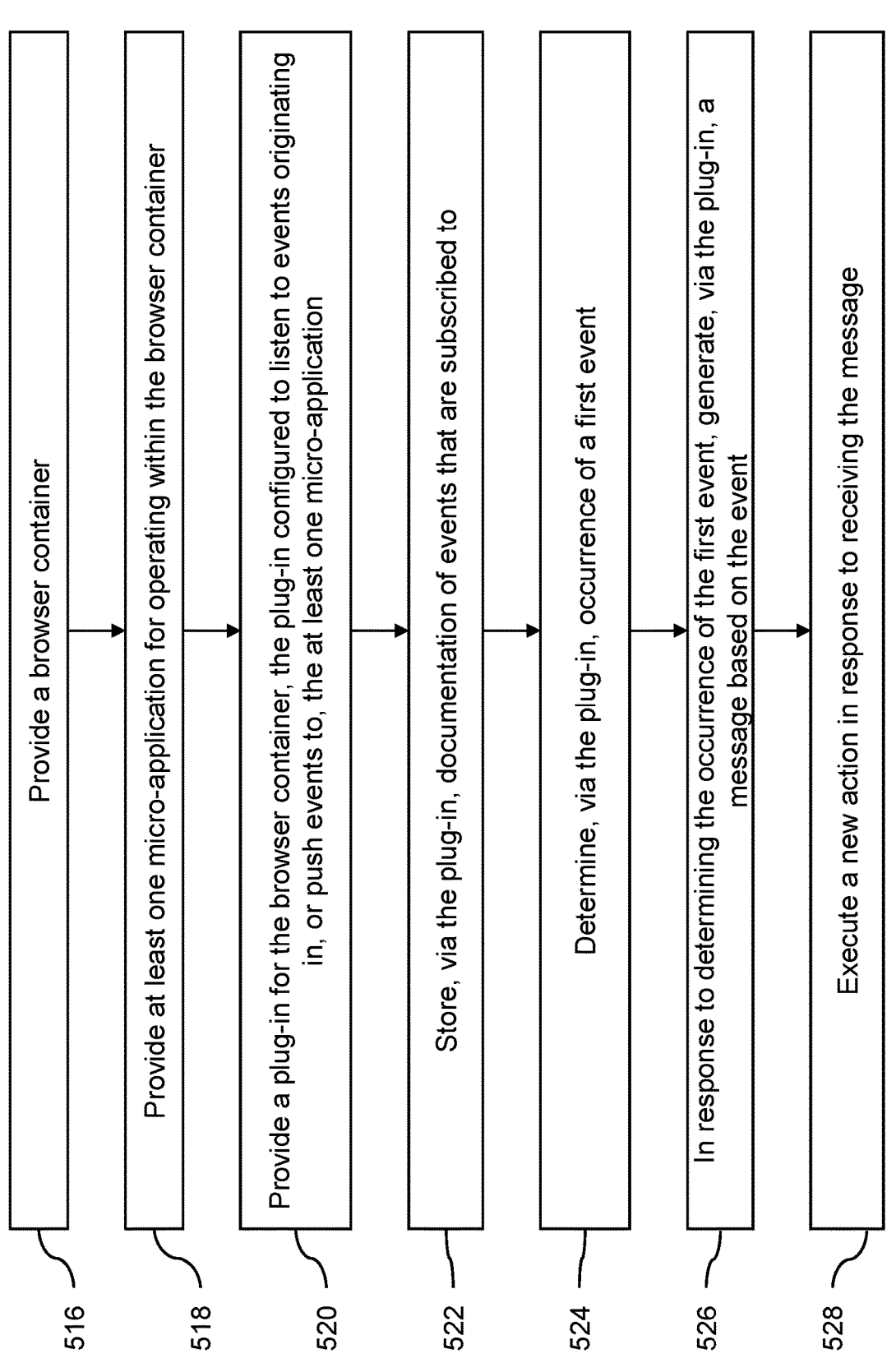

516  Provide a browser container

518  Provide at least one micro-application for operating within the browser container 520  Provide a plug-in for the browser container, the plug-in configured to listen to events originating in, or push events to, the at least one micro-application 522  Store, via the plug-in, documentation of events that are subscribed to 524  Determine, via the plug-in, occurrence of a first event 526  In response to determining the occurrence of the first event, generate, via the plug-in, a message based on the event 528  Execute a new action in response to receiving the message

FIG. 5B

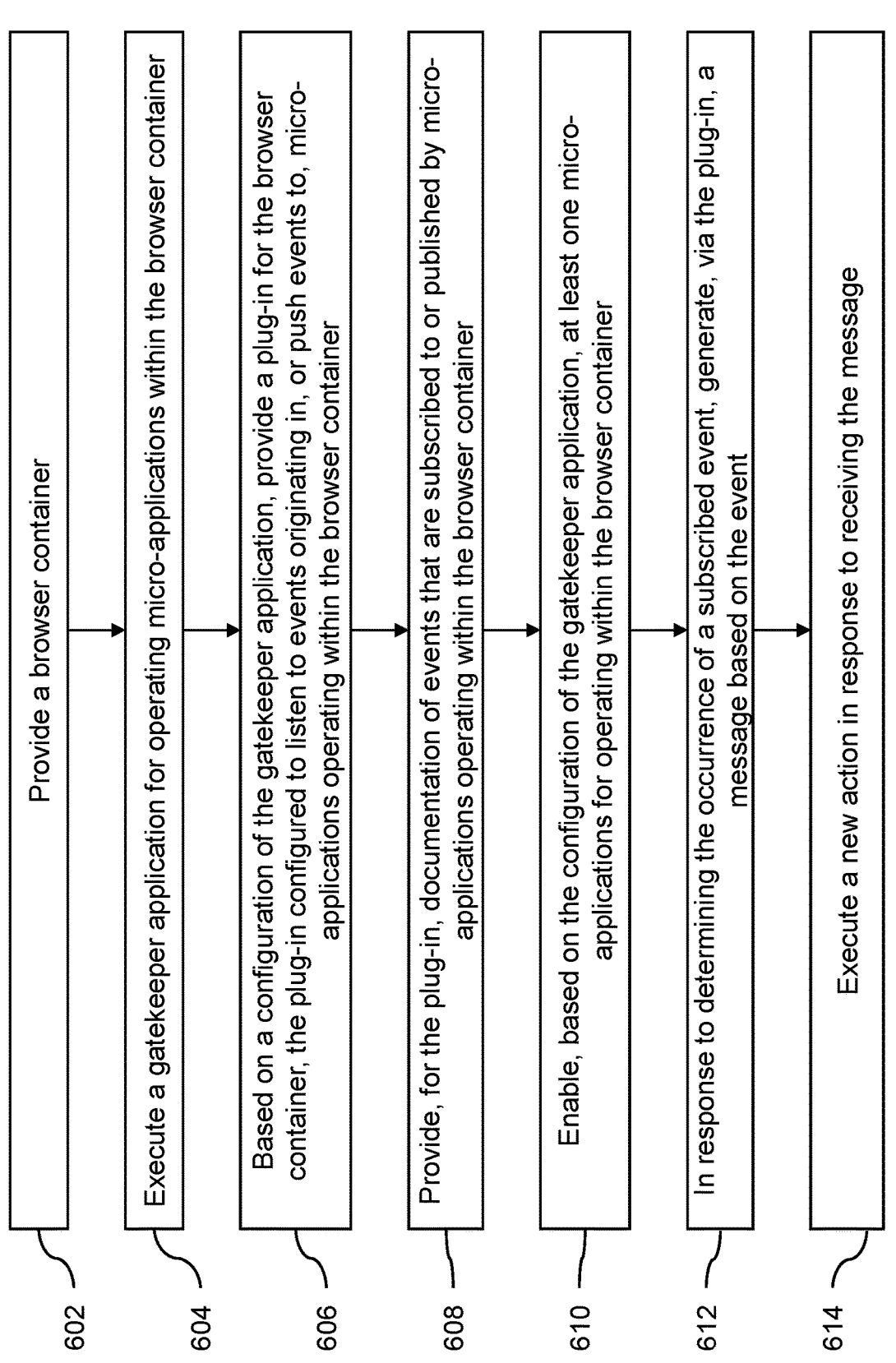

FIG. 6

Provide a browser container

Execute a gatekeeper application for operating micro-applications within the browser container Based on a configuration of the gatekeeper application, provide a plug-in for the browser container, the plug-in configured to listen to events originating in, or push events to, micro-applications operating within the browser container Provide, for the plug-in, documentation of events that are subscribed to or published by micro-applications operating within the browser container Enable, based on the configuration of the gatekeeper application, at least one micro-applications for operating within the browser container In response to determining the occurrence of a subscribed event, generate, via the plug-in, a message based on the event Execute a new action in response to receiving the message

602

604

606

608

610

612

614

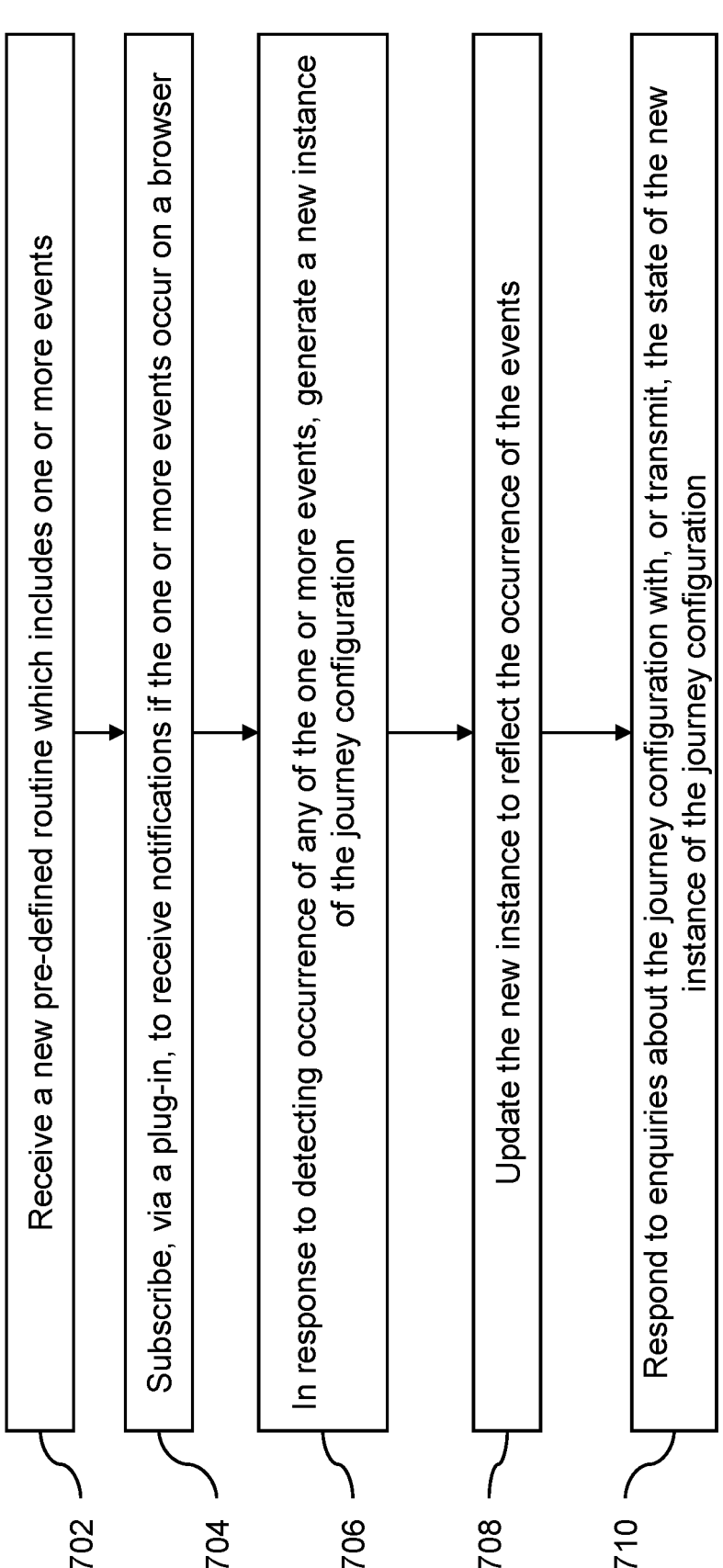

702 Receive a new pre-defined routine which includes one or more events

704 Subscribe, via a plug-in, to receive notifications if the one or more events occur on a browser 706 In response to detecting occurrence of any of the one or more events, generate a new instance of the journey configuration 708 Update the new instance to reflect the occurrence of the events 710 Respond to enquiries about the journey configuration with, or transmit, the state of the new instance of the journey configuration

FIG. 7

SYSTEM AND METHOD FOR IMPLEMENTING MICRO-APPLICATION ENVIRONMENTS

TECHNICAL FIELD

The following relates generally to micro-application environments, and more specifically to implementing micro-application environments via a browser container.

BACKGROUND

Existing software products can suffer from a number of different deficiencies that make the products difficult to scale, maintain, and/or integrate into more modern products, etc. For example, a software product may be a legacy product purpose built for, and maintained by, an enterprise. The legacy product may be effective at certain tasks. The legacy product, however, may be in a programming language no longer widely used (making servicing expensive), be monolithic such that extensive knowledge is required of the whole in order to implement changes, be difficult to extend, particularly into other more modern solutions, have functionality implemented on an ad-hoc basis (which can lead to, e.g., difficult maintenance) and include unconventional implementations resulting in upkeep issues, etc.

In another example, the software product can be a product which was not designed to be, or which did not contemplate or provide for, extensibility. Such a product can require significant efforts to make changes or to add on new features or programs. Such a product may have cumbersome add-ons created outside of the main program. In such products, the users may then need to be familiar with and navigate between several custom, less well-known, potentially poorly documented, applications or add-ons to complete a task reliant upon the product. For example, a user may be required to utilize multiple applications and/or add-ons to update an entry not originally contemplated in an initial product.

BRIEF DESCRIPTION OF THE DRAWINGS

Embodiments will now be described with reference to the appended drawings wherein:

FIGS. 5A to 5C are each a flow diagram of an example method for implementing micro-application environments.

FIG. 6 is a flow diagram of an example method for initiating a browser container with a plug-in for mediating between micro-applications.

FIG. 7 is a flow diagram of an example method for implementing micro-application environments with pre-defined configurations.

DETAILED DESCRIPTION

Figure 1:
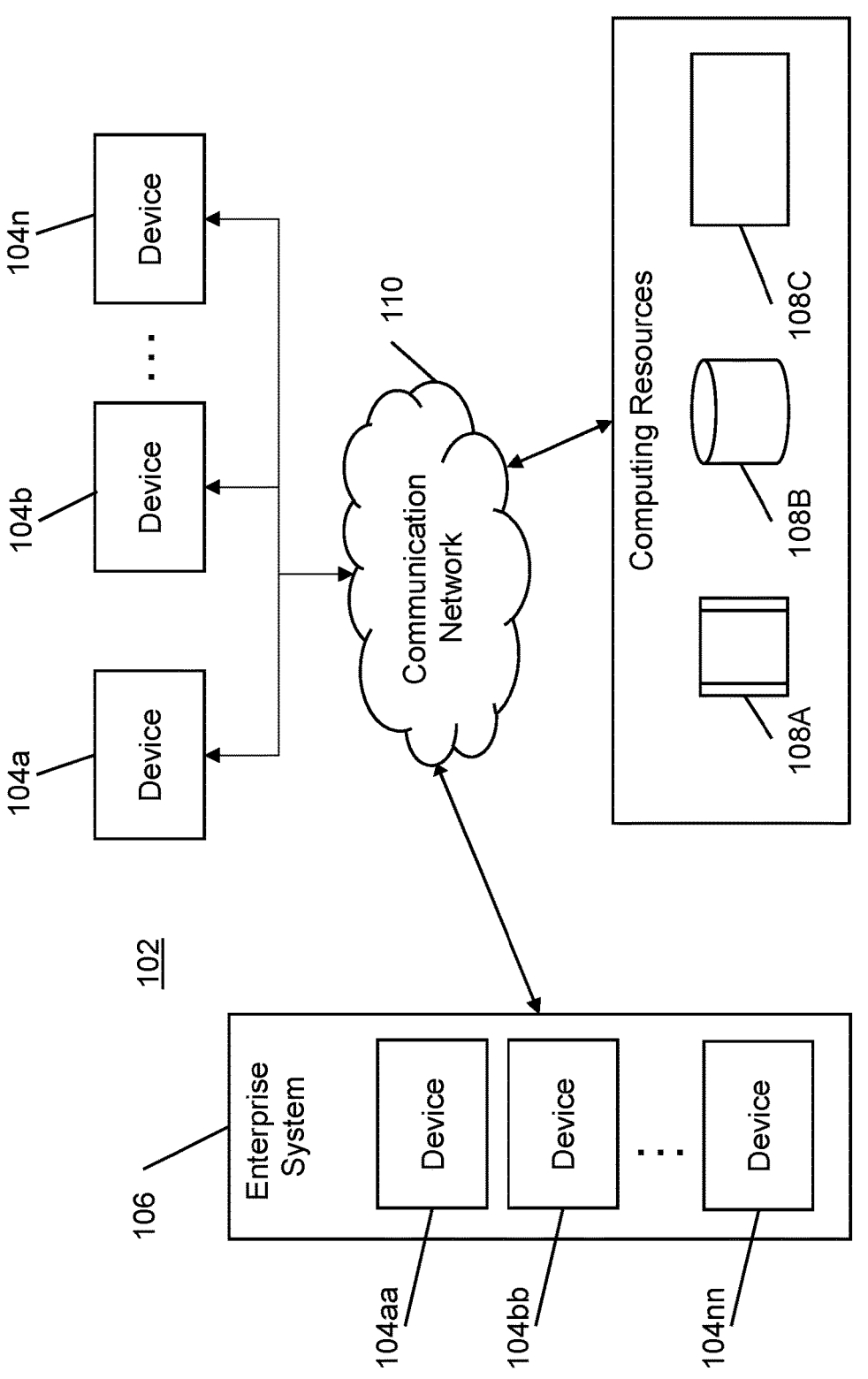
FIG. 1 is a schematic diagram of an example computing environment.

It will be appreciated that for simplicity and clarity of illustration, where considered appropriate, reference numerals may be repeated among the figures to indicate corresponding or analogous elements. In addition, numerous specific details are set forth to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

Disclosed herein are a system, method, and computer readable medium for implementing micro-application environments. The exemplary method includes one or more micro-applications operating within a browser, and a plug-in for the browser, which receives or listens to events from the micro-applications. The micro-applications register with the plug-in to publish events, or to be notified of published events, from other micro-applications or other sources. In order to register for the plug-in, the micro-application complies with certain maximum dependency criteria. One maximum dependency criteria can be that all published events are anonymous, in that knowledge of operation of the micro-application or other application which generates the event is not required to utilize the event. In an example, the maximum dependency criteria may specify that all micro-application is able to subscribe to published events with only a delineated list of JavaScript™ libraries. The delineated list may be a single JavaScript™ library.

By enforcing maximum dependency criteria and enforcing anonymous publication, and routing events through a browser plug in, the disclosed method can facilitate an environment of micro-applications that are relatively easy to scale (new instances of a widely available browser and configuration with the plug-in can quickly be adopted), maintain (small teams can manage micro-applications, and interdependency is limited to the published events), update (new micro-applications can be added, and developers can be free to incorporate same by subscribing to the events), and/or integrate with other applications (micro-applications can be developed for integrating with legacy or new systems, such that, for example, a single user interface can be used to control a plurality of legacy and other siloed systems).

Moreover, security procedures can be relatively easy to propagate via control of the plug-in. For example, the plug-in can be configured based on log-in credentials, and information control can be implemented by controlling which events are visible (e.g., certain events may occur on a device without the user of the device being able to access the event. For example, an address update micro-service can operate without the user having access to another application which relies on up-to-date address information), which events can be subscribed to, which micro-applications can operate within the browser, etc.

In one aspect, a system for implementing micro-application environments is disclosed. The system includes a processor, a memory coupled to the processor. The memory stores computer executable instructions that when executed by the processor cause the processor to provide a browser container. The instructions cause the processor to provide at least one micro-application for operating within the browser container. The instructions cause the processor to provide a plug-in for the browser container, the plug-in configured to listen to events originating in, or push events to, the at least one micro-application. The instructions cause the processor to store, via the plug-in, documentation of events that each of the at least one micro-application subscribes to. The instructions cause the processor to determine, via the plug-in, occurrence of a first event, the first event being sub-scribed to by the at least one micro-application. In response to determining the occurrence of the first event, the instruc-tions cause the processor to generate, via the plug-in, a message to the at least one micro-application based on the event. The instructions cause the processor to execute, via the at least one micro-application, a new action in response to receiving the message.

In example embodiments, the instructions further cause the processor to process, via the plug-in, requests to register a new micro-application as one of the at least one micro-applications by: updating the documentation to store (1) events the new micro-application subscribes to, and (2) definitions of events the new micro-application will publish. The plug-in processes requests to register based on whether the new micro-application complies with criteria defining maximum allowable dependencies.

In example embodiments, the at least one micro-applica-tion includes a first micro-application and a second micro-application, the first event occurs as a result of operation of the first micro-application, and the message is transmitted to the second micro-application to execute the new action. In example embodiments, the second micro-application is not in active use prior to the new action being executed.

In example embodiments, the instructions further cause the processor to transmit, based on an enterprise configura-tion, occurrence of at least one of the first event or the new action to an enterprise system subsequent to transmitting the message to the at least one micro-application. In example embodiments, the enterprise configuration is based on at least one of a time of day, a utilization of the device, a sensitivity of the new action, a connection status, and a protocol.

In example embodiments, the first event occurs in a remote computing system, and the plug-in detects the first event at least in part by subscribing to an event-based architecture implemented on the remote computing system. In example embodiments, the event-based architecture is registered to receive, and the plug-in publishes to the event-based architecture, events generated by the at least one micro-application.

In example embodiments, the first event is receiving new information, and the new action is updating existing records to reflect the received new information.

In example embodiments, the instructions further cause the processor to execute, via the plug-in, a notification based on the first event or the new action, the plug-in utilizing infrastructure of the browser container to place the notifi-cation external to the browser container.

In example embodiments, the instructions further cause the processor to transmit, via the plug-in, occurrence of the first event to a remote computing system. The instructions cause the processor to, in response, receive from the remote computing system, via the plug-in, at least one record related to the first event. The instructions cause the processor to include the at least one record related to the first event in the message for executing the new action.

In example embodiments, executing the new action at least in part comprises communicating with an application external to the browser container via a native application API accessible to the plug-in for providing is disclosed.

In another aspect, a method for implementing micro-application environments is disclosed. The method includes providing a browser container and providing at least one micro-application for operating within the browser. The method includes providing a plug-in for the browser. The plug-in configured to listen to events originating in, or push events to, the at least one micro-application. The method includes storing, via the plug-in, documentation of events that each of the at least one micro-application subscribes to. The method includes determining, via the plug-in, occur-rence of a first event, the first event being subscribed to by the at least one micro-application, and in response to deter-mining the occurrence, generating, via the plug-in, a mes-sage to the at least one micro-application based on the event. The method includes executing, via the at least one micro-application, a new action in response to receiving the message.

In example embodiments, the method further includes processing, via the plug-in, requests to register a new micro-application as one of the at least one micro-applica-tions by: updating the documentation to store (1) events the new micro-application subscribes to, and (2) events the new micro-application will publish. The plug-in processes requests to register based on whether the new-micro-appli-cation complies with criteria defining maximum allowable application dependency.

In example embodiments, the at least one micro-applica-tion includes a first micro-application and a second micro-application, the first event occurs as a result of operation of the first micro-application, and wherein the method further comprises transmitting the message to the second micro-application, to execute the new action. In example embodi-ments, the second micro-application is not in active use prior to the new action being executed.

In example embodiments, the method further includes transmitting, based on an enterprise configuration, occur-rence of at least one of the first event or the new action to an enterprise system subsequent to execution of the new action.

In example embodiments, the method includes, in response to determining the first event is associated with a pre-defined routine, retrieving at least one record related to the pre-defined routine. The method includes including the at least one record related to the first event in the message for executing the new action.

In example embodiments, at least one of the pre-defined routines and the at least one related record are stored on a remote computing system.

In another aspect, a non-transitory computer readable medium for implementing micro-application environments is disclosed. The computer readable medium includes com-puter executable instructions for providing a browser con-tainer and providing at least one micro-application for operating within the browser. The instructions are for pro-viding a plug-in for the browser. The plug-in configured to listen to events originating in, or push events to, the at least one micro-application. The instructions are for storing, via the plug-in, documentation of events that each of the at least one micro-application subscribes to. The instructions are for determining, via the plug-in, occurrence of a first event, the first event being subscribed to by the at least one micro-application, and in response to determining the occurrence, generating, via the plug-in, a message to the at least one micro-application based on the event. The instructions are for executing, via the at least one micro-application, a new action in response to receiving the message.

Referring now to FIG. 1, an exemplary computing envi-ronment 102 is illustrated. In the example embodiment shown, the computing environment 102 includes an enter-prise system 106, one or more devices 104 (shown as devices 104*a*, 104*b*, . . . 104*n*, external to the enterprise system 106, and devices 104*aa*, 104*bb*, and 104*nn*, internal to the enterprise system 106), and a remote computing environment 108 (shown individually as tool(s) 108A, database(s) 1088, and hardware 108C). Each of these components can be connected by a communications network 110 to one or more other components of the computing environment 102. The one or more devices 104 may hereinafter be referred to in the singular for ease of reference.

An external device 104 can be operated by a party other than the party which controls the enterprise system 106; conversely, an internal device 104 can be operated by the party in control of the enterprise system 106. Any device 104 can be used by different users, and with different user or project accounts. For example, the internal device 104 can be used by an employee, third party contractor, customer, a project user, etc., as can the external device 104. The user may be required to be authenticated prior to accessing the device 104, the device 104 can be required to be authenticated prior to accessing either the enterprise system 106 or the remote computing environment 108, or any specific accounts or resources within computing environment 102.

The device 104 can access information within the enterprise system 106 or remote computing environment 108 in a variety of ways. For example, the device 104 can access the enterprise system 106 via a web-based application, or a dedicated application, etc. Access can require the provisioning of distinct types of credentials (e.g., login credentials, two factor authentication, etc.). In example embodiments, each different device 104 can be provided with a unique degree of access, or variations thereof. For example, the internal device 104 can be provided with a greater degree of access to the enterprise system 106 as compared to the external device 104.

Devices 104 can include, but are not limited to, one or more of a personal computer, a laptop computer, a tablet computer, a server, a desktop computer, a notebook computer, a hand-held computer, a personal digital assistant, a portable navigation device, a mobile phone, a wearable device, a gaming device, an embedded device, a smart phone, a virtual reality device, an augmented reality device, third party portals, an automated teller machine (ATM), and any additional or alternate computing device, and may be operable to transmit and receive data across communication networks such as the communication network 110 shown by way of example in FIG. 1.

The remote computing environment 108 (hereinafter referred to in the alternative as computing resources 108) includes resources which are stored or managed by a party other than operator of the enterprise system 106 and are used by, or available to, the enterprise system 106. For example, the computing resources 108 can include cloud-based storage services (e.g., database(s) 108B). In at least some example embodiments, the computing resources 108 include one or more tools 108A developed or hosted by the external party, or tools 108A for interacting with the computing resources 108. In at least one contemplated embodiment, the tool 108A (referred to in the singular for ease of reference) is a micro-application for accessing a data storage managed by a particular application (e.g., accessing a database administered by a legacy application), or a micro-application for masking data, etc., within the computing resources 108. The tool 108A can be a micro-application that interacts with another application which is not managed by the enterprise system 106, such as a Salesforce™ application, etc. The computing resources 108 can also include hardware resources 108C, such as access to processing capability of server devices (e.g., cloud computing), and so forth.

Communication network 110 may include a telephone network, cellular, and/or data communication network to connect distinct types of client devices. For example, the communication network 110 may include a private or public switched telephone network (PSTN), mobile network (e.g., code division multiple access (CDMA) network, global system for mobile communications (GSM) network, and/or any 3G, 4G, or 5G wireless carrier network, etc.), Wi-Fi or other similar wireless network, and a private and/or public wide area network (e.g., the Internet). The communication network 110 may not be required to provide connectivity within the enterprise system 106 or the computing resources 108, or between devices 104, wherein an internal or other shared network provides the necessary communications infrastructure.

The computing environment 102 can also include a cryptographic server or module for performing cryptographic operations and providing cryptographic services (e.g., authentication (via digital signatures), data protection (via encryption), etc.) to provide a secure interaction channel and interaction session, etc. The cryptographic module can be implemented within the enterprise system 106, or the computing resources 108, or external to the aforementioned systems, or some combination thereof. Such a cryptographic server can also be configured to communicate and operate with a cryptographic infrastructure, such as a public key infrastructure (PKI), certificate authority (CA), certificate revocation service, signing authority, key server, etc. The cryptographic server and cryptographic infrastructure can be used to protect the various data communications described herein, to secure communication channels therefor, authenticate parties, manage digital certificates for such parties, manage keys (e.g., public, and private keys in a PKI), and perform other cryptographic operations that are required or desired for particular applications carried out by the enterprise system 106 or device 104. The cryptographic server can used to protect data within the computing environment 102 (e.g., including data stored in database(s) 108B) by way of masking, or encryption for data protection, digital signatures or message digests for data integrity, and by using digital certificates to authenticate the identity of the users and entity devices with which the enterprise system 106, computing resources 108, or the device 104 communicates, to inhibit data breaches by adversaries. It can be appreciated that various cryptographic mechanisms and protocols can be chosen and implemented to suit the constraints and requirements of the computing environment 102, as is known in the art.

The enterprise system 106 can be understood to encompass the whole of the enterprise, a subset of a wider enterprise system (not shown), such as a system serving a subsidiary or a system for a particular branch or team of the enterprise (e.g., a resource migration division of the enterprise).

The enterprise system 106 may store a plurality of data sets in the computing resources 108 (e.g., within the database 1088) of such a scale, or of such a diversity (whether diversity the data itself, or diversity in the applications that manage the data sets) that it makes the plurality of data sets difficult to manage. For example, financial institutions such as commercial banks generate vast amounts of data for various different operations (personal banking, investing, lending, web-based services, etc.). The different operations can have dynamic, and varied approaches to managing the data generated for the operations (e.g., different regulatory requirements can impose different record-keeping requirements, data can be stored in different formats owing to legacy digital infrastructure, different management initiatives can result in data being stored in different formats, locations, with different permissions etc.).

The vast amounts of records (new or existing), and their diverse and distinct nature can make it difficult to enable and maintain functionalities to interact with the diverse data. For example, a legacy application of the enterprise system 106 can manage certain customer data, and the legacy application can integrate poorly with tools 108A of the computing resources 108. It can be difficult or painstaking to transfer data out of the legacy application into more modern products to facilitate newer functionality. The legacy application may be impossible to modify to account for small changes (e.g., regulatory requirements, etc.). It may be prohibitively expensive to add additional capacity to store new data to be managed by the legacy application, for at least the reasons already mentioned.

From a security perspective, it can be difficult to robustly police or otherwise control access to data if the legacy application results in workarounds or other solutions which do not allow for, or are not designed for, data security. For example, new data can be inadvertently added so as to be visible to users without the proper credentials on an add-on that results from a limitation of the legacy application. Moreover, data access can be difficult to manage to account for changes (either to the legacy application, or to personnel and external systems) over time.

It is noted that while the above discussion references difficulties with a legacy application, it is understood that similar considerations apply to software products that are inflexible.

Figure 2:
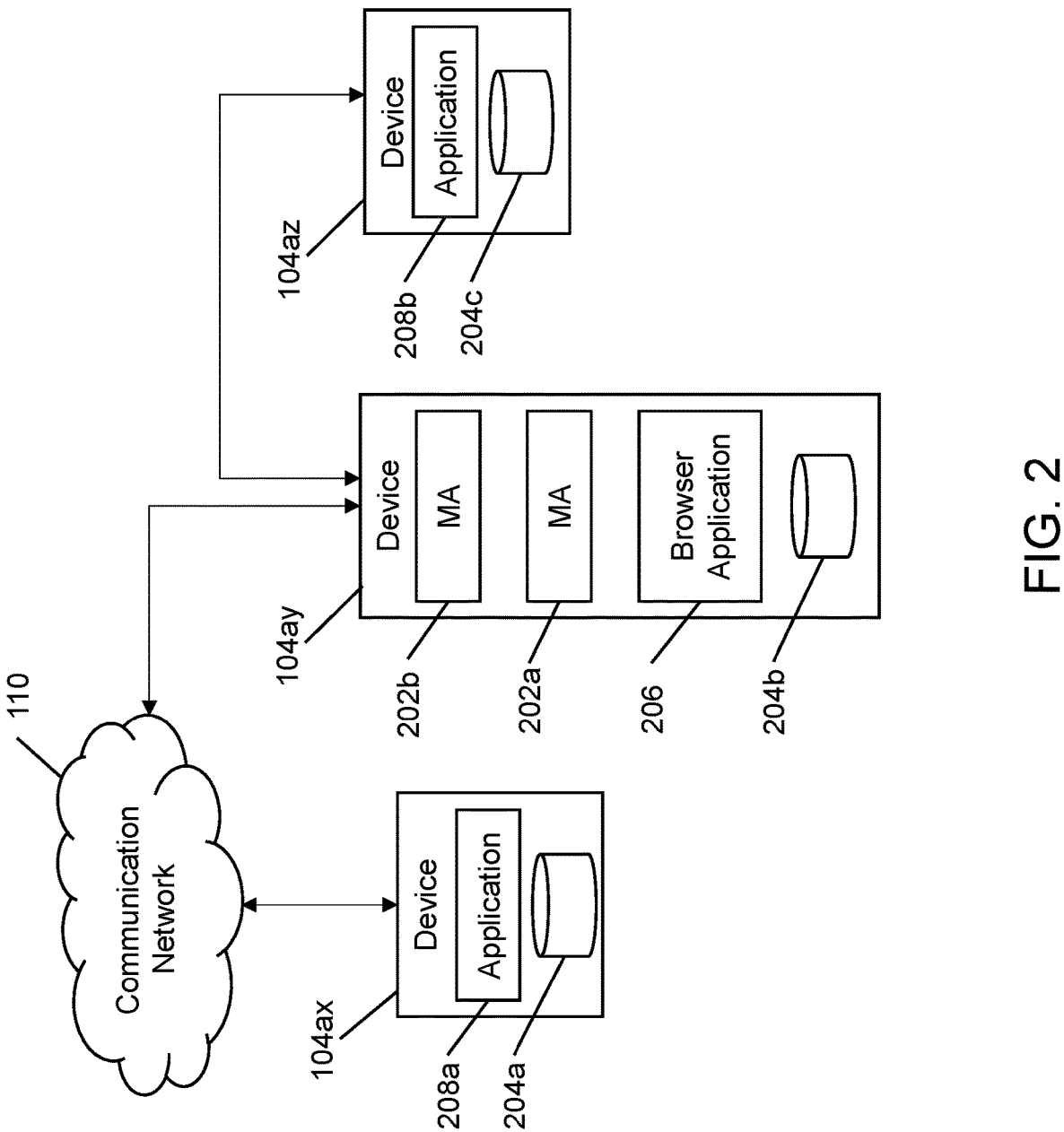
FIG. 2 is a block diagram of an example architecture of a micro-application environment.

Referring now to FIG. 2, a block diagram of an example architecture of a micro-application environment is shown.

In the shown environment, example devices 104*ax*, 104*ay*, and 104*az*, are shown to illustrate the different computing environments for implementing a micro-application environment. For example, device 104*ax* can be device located on an enterprise system 106 remote to the device 104*ay*, with the two devices being connected via the communication network 110. Device 104*ax* can be a device located proximate to the device 104*ay*, or connected to the device 104*ay* by other than the communication network 110 (e.g., via an ethernet cable, or a proprietary cable, such as a printer cable). The different devices illustrate that the micro application environment can be implemented upon (1) a single device (e.g., device 104*ay*), (2) a device and a backend, connected via a communication network 110 (e.g., device 104*ax* and device 104*ay*), (3) two devices connected to one another other than via a communication network 110 (e.g., device 104*az* and device 104*ay*), or some combination of the aforementioned configurations. It is understood that the devices shown in FIG. 2 can be located within one of the enterprise system 106, computing resources 108, or external to these systems, in varying combinations (e.g., device 104*ax* and device 104*ay* may both be within the enterprise system 106, or one of the two devices can be within the computing resources 108).

The device 104*ay* has operating thereon one or more micro-applications 202 (shown as MA 202*a*, and 202*b*) within the browser application 206. Applications and micro-applications operating other than within the browser application 206 are denoted as applications 208 (e.g., the shown applications 208*a*, and 208*b*). Each device 104 shown in FIG. 2 can operate one, or more than one application or micro-application to perform or facilitate various tasks or functions.

Micro-applications include, but are not limited to, applications that are intended to perform a limited function or set of functions. Micro-applications are generally, although not necessarily, self-contained, and implement a single and well-defined business capability. Each micro-application is a code base which can be managed by a small development team and does not need to share the same technology stack, or frameworks, which allows each team to select the right approach for the micro-application's purpose. Ideally, a single development team can build, deploy and test a micro-application owing to its more limited scope. Together, a set of micro-applications can provide a robust and scalable architecture for implementing a computing environment.

In one embodiment, each micro-application can perform exclusively different function(s), or there may be some overlap between micro-applications. For example, micro-application 202*a* can be used to control or interact with the device 104*az*, which may be a printer, or a pin pad for validating bankcards. Micro-application 202*b* can be used to communicate with the device 104*ax* which may be a back-end server of the enterprise system 106, etc. This disclosure contemplates that the devices 104 can be capable of instantiating a plurality of applications 208 and micro-applications 202 of a plurality of different types. In at least some embodiments, the device 104 has limited computing power and the micro-applications 202 operated thereon are limited as a result. Each device 104 may be able to implement an operating system (not shown), which can be utilized by the micro-applications 202 to provide notifications.

Each device 104 shown in FIG. 2 can include a database 204 (e.g., shown as databases 204*a*, 204*b*, and 204*c*). The databases 204 can store information for use by each of the micro-applications 202. For example, the database 204*b* can be used to store data to be used by the micro-application 202*c* for controlling a printer device 104.

Each device 104 can implement or instantiate the browser application 206 (hereinafter referred to as a browser(s), for simplicity). The browser 206 can be a custom browser, or an existing browser, such as the Google Chrome™, or Microsoft Edge™ browsers, and so forth. The browser 206 can facilitate the operation of one or more micro-applications 202 therein (i.e., the browser 206 can act as a browser container). In example embodiments, the browser 206 can also interact with one or more applications 208 operating on the device 104 to generate one or more notifications. For example, the browser 206 can be a Google Chrome™ browser, and the application programming interfaces (APIs) therein for interacting with the operating system application 208 can be used to generate a notification on the device 104.

The browser 206 also has access to, and can utilize, at least some portion of the database 204. In example embodiments, operation of the browser 206 can result in a plurality of databases 204 on a plurality of devices 104 being used to perform tasks. For example, and as will be described in greater detail herein, the browser 206 can be used to distribute newly entered user data to a plurality of different devices, including devices 104 located on the back end of the enterprise system 106.

Figure 3A:
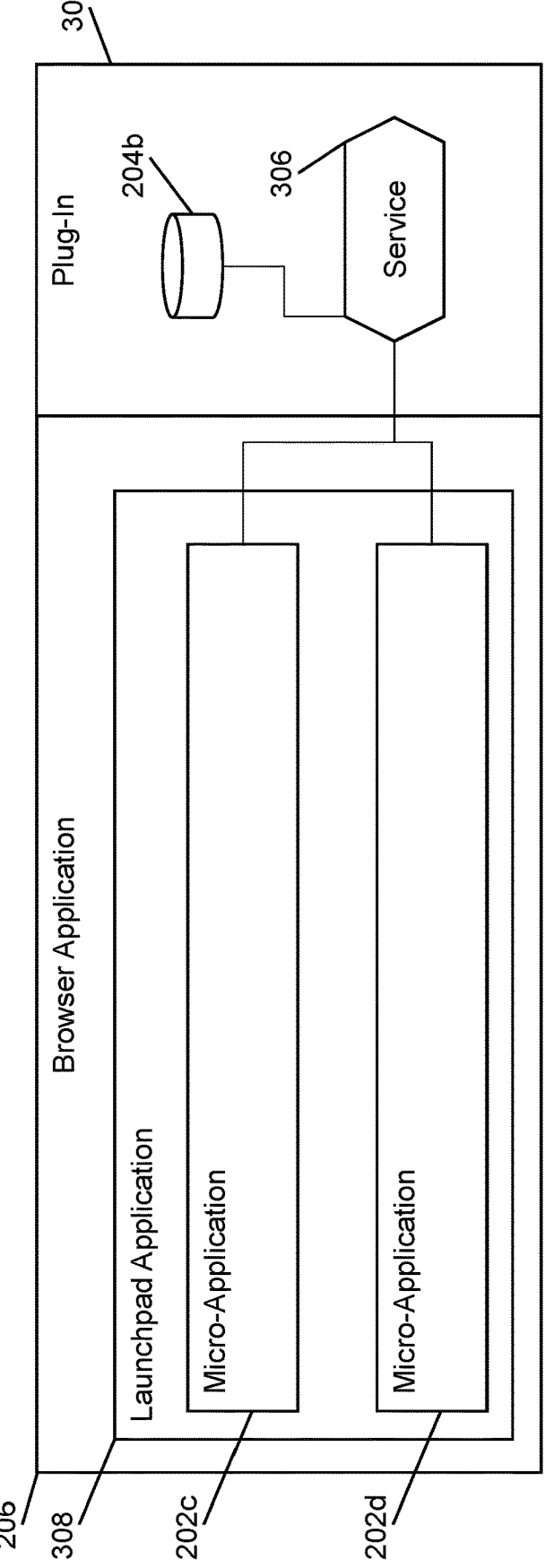
FIGS. 3A to 3C are each a block diagram of an example framework for implementing a micro-application environment with a browser container.
Figure 3B:
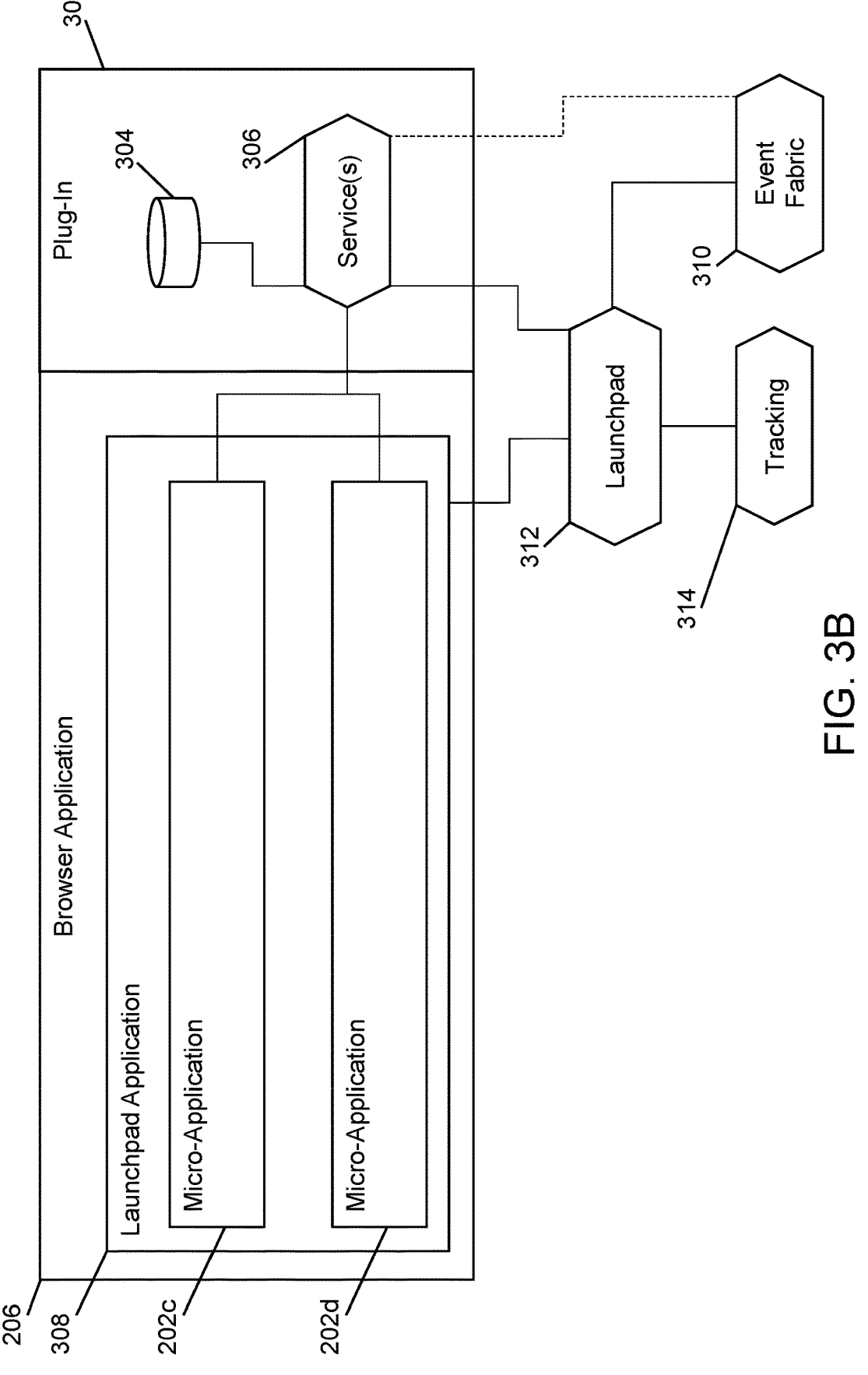
Figure 3C:
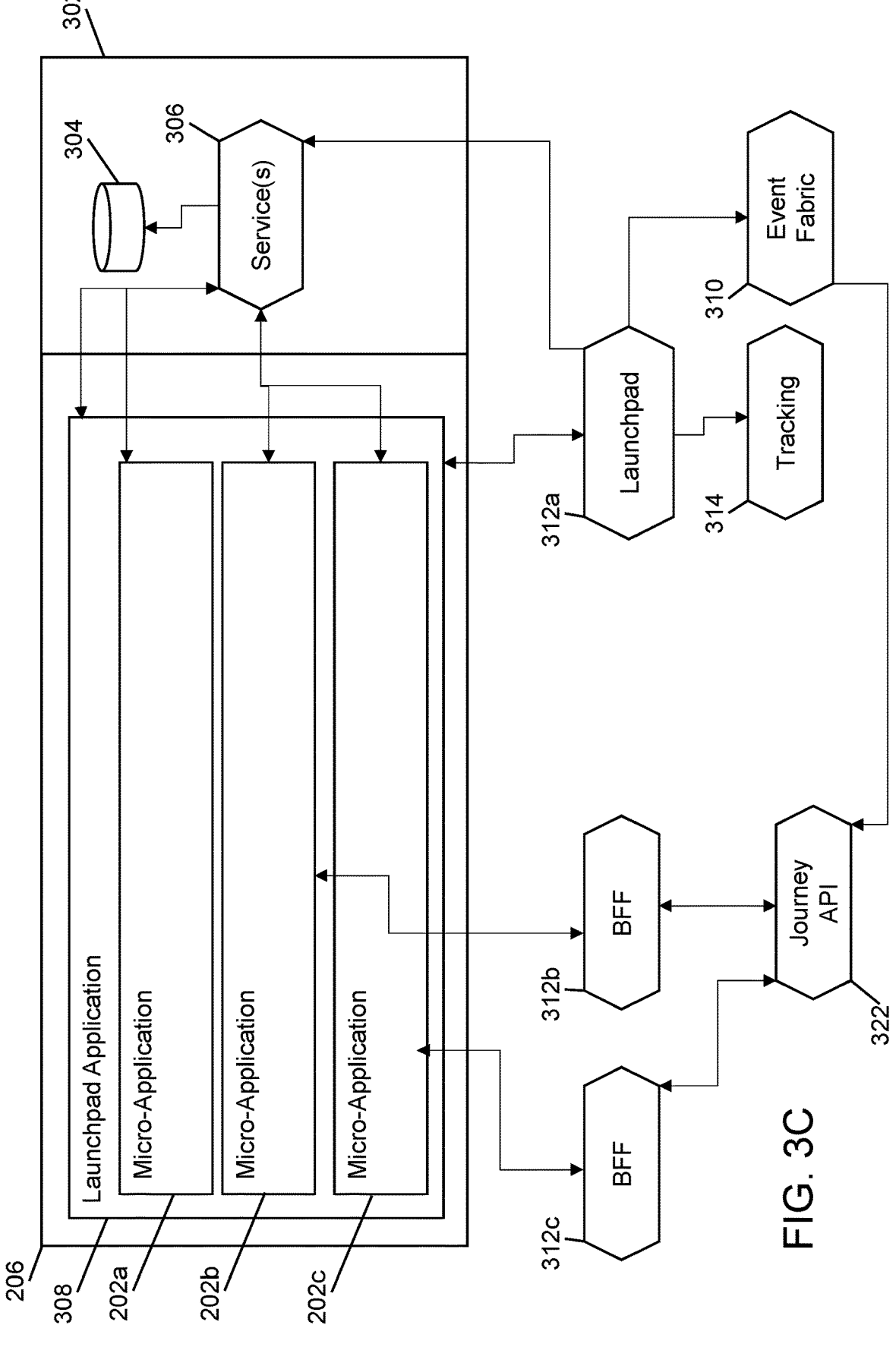

FIGS. 3A to 3C are each a block diagram of an example framework for implementing a micro-application environment with a browser container, such as browser 206.

In the shown embodiments, the browser 206 facilitates the operation of one or more micro-applications 202 within the browser 206, including the launchpad application 308, and the micro-applications 202c and 202d. The browser 206 also includes one or more plug-ins 302 (shown, and referred to, in the singular, for ease of reference) for facilitating launchpad application 308 and/or micro-application 202 functionality.

The launchpad application 308 can be used to control one or more visual aspects of micro-applications 202 operating within the browser 206. For example, the launchpad application 308 can define the layout of menus or interactive elements of the micro-applications 202 operating within the browser 206, permissions the micro-applications 202 have with respect to menu or navigation elements of the browser 206, etc.

The launchpad application 308 can also be used to control notifications generated by the micro-applications 202. For example, the launchpad application 308 can control how frequently a notification can be generated, a type of notification generated (e.g., whether and how often a micro-application 202 can generate and serve a notification, the contents of the notification, etc.).

In example embodiments, the launchpad application 308 is used to configure which micro-application 202 can be included in instances of the browser 206 (alternatively referred to as a gatekeeping function). For example, the launchpad application 308 can require login credentials for a user, and inhibit or otherwise preclude micro-applications 202 that the provided credentials do not permit running within the launchpad application 308. In an example, the launchpad application 308 is a custom micro-application of the enterprise system 106 which controls access and implementation of custom micro-applications 202 and other micro-applications 202 provided by or required by the enterprise system 106 for enterprise operations.

Installation and operation of the launchpad application 308 within the browser 206 can be controlled, limited, or otherwise interfered with by the plug-in 302. The plug-in 302 can be browser 206 specific, for example, and implementable solely on a Google Chrome™ browser 206. The plug-in 302 can be provided with varying degrees of access to operations of micro-applications 202 within the browser 206, or operations of the browser 206 itself. For example, the plug-in 302 can be configured with full permissions to listen to any events occurring within the browser 206, and require that the browser 206 is exclusively dedicated to an instance of the launchpad application 308 in order for the launchpad application 308 to operate. In another example, the plug-in 302 can be configured to listen to events generated by micro-applications 202 or the launchpad application 308 during operation. In a more granular example, the plug-in 302 can listen to data-entry events in a micro-application 202 for modifying existing accounts operating within the launchpad application 308.

The plug-in 302 can also be used to configure various aspects of the launchpad application 308. For example, the plug-in 302 can be used to define which micro-applications 202 can be installed in, or operate within or alongside the launchpad application 308, to define allowable functionalities of the micro-applications 202 (e.g., the plug-in 302 may only allow a subset of the micro-applications 202 to operate), etc.

The plug-in 302 can store data within the database 204b, or allot a portion thereof for operation of the plug-in 302. For example, the plug-in 302 can store micro-application 202 subscription data on the database 204b.

The plug-in 302 include service(s) 306. The service 306 can include some or all aspects of a variety of different services for facilitating communications between, to, or from the micro-applications 202 within the launchpad application 308. For example, the service 306 can determine an appropriate destination for messages or events generated by a micro-application 202 in the launchpad application 308, determine and implement any modifications required to facilitate transmission of an event or message generated by a micro-application 202 (e.g., reformat a message), etc. The service 306 can be used to perform some combination of services, such as routing and formatting the event or message.

The plug-in 302 stores (e.g., via database 204b) documentation of both (1) events subscribed to by the micro-applications 202 operating within the browser 206, and (2) a definition of events published by the micro-applications 202, if any. For example, a ledger (not shown) may be stored on the database 204, describing events published by the micro-applications 202 operating in the launchpad application 308. The ledger can store a listing both of micro-applications 202 which are subscribed to the published events, and events subscribed to by applications 208 not operating within the browser 206. The ledger can also store information about which events occurring external to the browser 206 the micro-applications 202 subscribe to.

A micro-application 202 can be allowed to publish events, or register to the micro-application environment via the plug-in 302, or more generally added to the documentation, only upon compliance with one or more criteria. In at least some example embodiments, the criteria include compliance with the requisite programming language or format, a level of reliability (e.g., unreliable micro-applications 202 may be rejected), sufficient credentials (e.g., on behalf of the user seeking to establish the publication or to subscribe to an event of another micro-applications 202. For clarity, a user may be prohibited from subscribing to events for which they do not have the necessary security credentials), etc. The criteria can include criteria unrelated to performance, such as whether the name is sufficiently descriptive, whether the description of the function of the event complies with convention, etc.

Documented events can be defined in a variety of different manners. In one example embodiment, for example, an event is documented by a title, description of the payload of the event, an example of the payload, and a contact person or team.

The documented published events can be anonymous, such that a working knowledge of the underlying micro-application 202 generating the event is not required in order to subscribe to the event. For example, a customer validation micro-application 202 can be subscribed to listen to authentication events from a pin pad, without knowing of the operation of the pin pad application.

A micro-application 202 can register with the plug-in 302 to publish one, or more than one event. Similarly, the micro-application 202 can register with the plug-in 302 to subscribe to one, or more than one event.

Subscription documentation can include one or more parameters identifying preferences for receiving a published event. For example, the subscription parameters can include reformatting rules in order to facilitate a micro-application 202 receiving notification of the event. In a more granular example, the subscription preference of a micro-application 202 can specify that messages based on an event with a timestamp in seconds rounds to the nearest minute.

In this way, the plug-in 302 is able to facilitate communication between, from, or to, micro-applications 202 within the browser 206. In the example shown in FIG. 3A, for example, the plug-in 302 can be used to facilitate communications between micro-application 202c and micro-application 202d. More particularly, data entered into the micro-application 202c can be published as an event to plug-in 302, which event may be subscribed to by the micro-application 202d. In other words, without recourse to a micro-application 202 or other application external to the browser 206, coordination between two micro-applications within the browser 206 can occur. In one example embodiment, the entered data reflects how many items have been added to a digital shopping cart, and the entered data can be propagated to all micro-applications 202 subscribed to that event (e.g., an invoicing micro-application, a payment micro-application, etc.). In another example embodiment, the entered data is address data, such that the updated address is propagated between multiple micro-applications 202 within the browser 206 automatically, if the multiple micro-applications 202 subscribe to the event. This application contemplates various configurations to automatically propagate events. For example, certain micro-application 202 can be more widely dispersed, and be used as a hub for having dependent micro-applications. Particularizing the example, micro-application A can publish the first event, micro-application B can be subscribed to that event, and micro-application B can publish receipt of the first event from micro-application A to micro-applications C through F.

In the embodiment shown in FIG. 3B, for example, the plug-in 302 is used to facilitate communication between a micro-application 202 within the browser 206, and an application implemented external to the browser 206.

Applications external to the browser 206 can subscribe to events generated by micro-applications 202 within the browser 206, by registering with the plug-in, directly, or indirectly. In example embodiments, the external applications are applications operated on the same device as the browser 206, but not within the browser 206, and can register directly with the plug-in 302. In at least some contemplative example embodiments, the external applications are applications instantiated or running on a device external to the device operating the browser 206. Similar to the micro-applications 202 registered with the plug-in 302, the external applications 208 can be registered to receive events from an event fabric architecture 310, which event fabric architecture 310 can register to be notified by the plug-in 302 of events occurring within the browser 206. For example, the plug-in 302 may determine or become notified of an event occurring in the micro-application 202d, the event corresponding to updated address information being entered, and notify the event fabric architecture 310. As with micro-applications 202, the event fabric architecture 310 can be registered with the plug-in 302 as a subscriber to receive notifications of certain events, and with certain subscription preferences. Similarly, the plug-in 302 can be registered with the event fabric architecture 310 to receive events originating in, or detected by, or otherwise related to the event fabric architecture 310.

The plug-in 302 can be directly connected to the event fabric architecture 310 (as shown by the dotted line), or the plug-in 302 can be connected to the event fabric architecture 310, indirectly. For example, in the shown embodiment, the event fabric architecture 310 is connected to the service 306 via a back end to front end (BFF) application 312 associated with the launchpad application 308. In this way, the launchpad application 308, and associated BFF application 312, can be used to control permissions to receive and publish events. For example, the BFF application 312 can configure the launchpad application 308, and/or the plug-in 302, such that the plug-in 302 is only subscribed to events that the credentialed user of the launchpad application 308 is entitled to review.

The BFF application 312 can communicate with a tracking application 314 (e.g., a distributed cache operated by Hazelcast™, responsible for storing launchpad user sessions), to track occurrences of events during a user session of the launchpad application 308. The tracked events can be used both to enhance the services of the plug-in 302 (in the event of an error), and to maintain a history of changes within the ecosystem. In example embodiments, the tracking application 314 is an application maintained by the enterprise system 106.

The event fabric architecture 310 can be a Kafka™ based event fabric used to publish events and/or to subscribe applications to receive events.

In the embodiment shown in FIG. 3C the plug-in 302 is used to facilitate communication between a micro-application 202, and an application functionality external to the browser 206, with additional interaction between the micro-applications 202 and a journey application programming interface (API) 322.

In FIG. 3C, the micro micro-applications 202a, 202b, and 202c are, in addition to being in communication with the service 306 (or the plug-in 302, generally), are in communication with a respective BFF application 312 for the purposes of connecting to the journey API 322.

The journey API 322 can be connected to the event fabric architecture 310 so that events related to the journey API 322 can be either additionally relayed to event fabric architecture 310, or to confirm existing events within the event fabric architecture 310, or the plug-in 302, etc. . . .

The journey API 322 can be used to create or coordinate events based on one or more dependencies.

Figure 4:
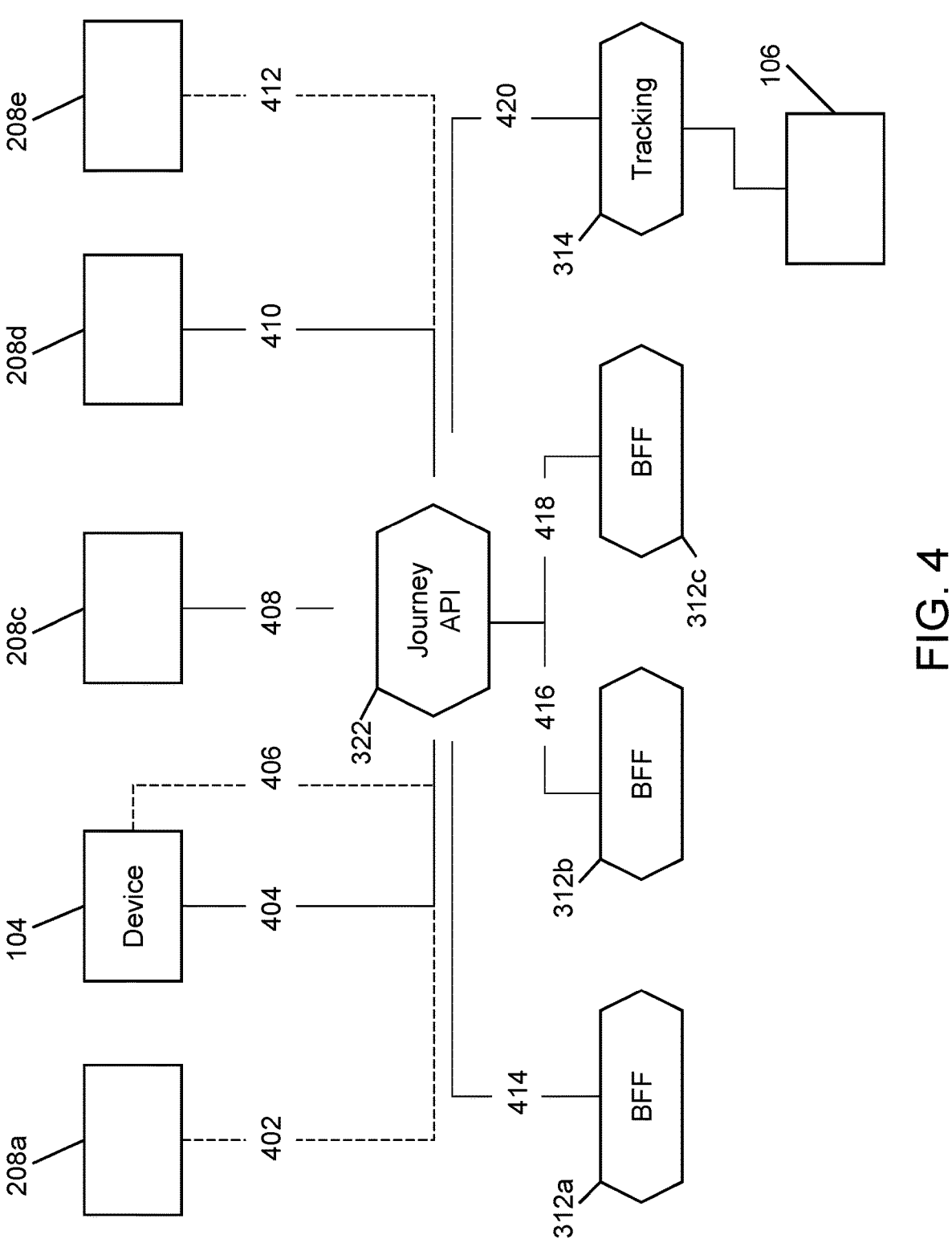
FIG. 4 a schematic diagram of an example aspect including pre-defined configurations within a micro-application environment.

For example, as shown in FIG. 4, a journey (alternatively referred to as a pre-defined routine) can be created by an application 208a, during block 402. The pre-defined routine can include a collection of events to which the journey API 322 is subscribed to, and any metadata related to the sequence of the occurrence of the events. For example, the journey API 322 can be used to create a pre-defined routine to facilitate a user credit card registration, wherein the pre-defined routine is defined by the following events in the following order: applicant data entered, preliminary data vetting, approval or additional information required, and notification of user. Each of the constituent events of the example pre-defined routine can be completed by a different micro-application 202 and/or application 208.

In example embodiments, to coordinate events by micro-applications 202 within the browser 206, and external applications 208, taking into account that the micro-applications 202 can anonymously publish events, the journey API 322 can be used as intermediate subscription documentation. For example, the journey API 322 can be configured to listen for events from a device 104 or accounts receiving user data, and transmit occurrence of that event to a backend, potentially siloed, credit card application 208 operated by the credit card division of the enterprise system 106. The credit card application 208 can thereafter publish an event to the event fabric architecture 310 to notify the device 104 (e.g., via the plug-in 302) if the application has been accepted.

In some contemplated example embodiments, the journey API 322 can supplement a pre-defined routine. For example, the journey API 322 can be pre-configured to implement a notification system, where bottleneck events or unfinished events are tracked. The journey API 322 can automatically create or generate new events for notifying the next individual or account within the sequence defined by the pre-defined routine of outstanding action. For example, the journey API 322 can be configured with a service timer in relation to each event of the sequence of events therein, and upon the service timer expiring, can add a notification event to the pre-defined routine based on the bottlenecking event.

Each pre-defined routine defined within the journey API 322 is given a unique, or semi-unique (e.g., journey ID numbers may be repurposed) journey ID. A journey ID can be appended to each event associated with the pre-defined routine. For example, in respect of the example user credit card application, the micro-application 202 for originating the credit card application can transmit the event of the newly entered data via the plug-in 302, and to the journey API 322. The journey API 322 can return a unique journey ID for the credit card application to the micro-application 202 to include as a payload in a revised published event. Thereafter, any micro-application 202, or application 208 that utilizes information generated by the credit card application event can be configured to denote dependent events with the same journey ID. In example embodiments, the plug-in 302 may proactively query the journey API 322 prior to publishing the event for a journey ID. In at least some contemplated example embodiments, one or more micro-applications 202 are configured to communicate with the journey API 322 prior to publishing an event in order to retrieve the journey ID. For example, the micro-application 202 for originating credit card applications can be config-ured to retrieve a new journey ID from the journey API 322 prior to publication. Subsequent micro-applications 202 can be configured to retrieve the journey ID as a payload from any message based on events from the micro-application 202 for originating credit card applications. Each micro-application 202 notified of the journey ID can be configured to confirm with the journey API 322 that the journey ID is still active, and that any required sequence is being fol-lowed, etc.

In example embodiments, to determine a status of a pre-defined routine, the journey API 322 can search pub-lished events for the journey ID to populate a status (e.g., via a metadata repository associated with each particular jour-ney ID). In some embodiments, for example, each micro-application 202 or application 208 that subsequently utilizes the entered information notifies the journey API 322 of completion of subsequent steps related to a particular journey ID upon detecting the previous event included a journey ID or was otherwise related to a pre-defined routine.

The status of pre-defined routines can be served to devices 104 in response to queries related to the journey ID. For example, referring again to the earlier example of the credit card application, a device 104 (e.g., operated by a branch level bank employee) can inquire with the journey API 322 for the status of a credit card application (e.g., block 404) by providing a journey ID. The journey ID can automatically, and/or without visibility to the user operating the device 104, be populated into any request as a result of the operation of plug-in 302, where the micro-application 202 for credit card applications can publish the event branch wide, so that any device 104 within the branch automatically populates credit card application enquires related to the particular customer with the journey ID. The journey API 322 may fetch, or may already be notified of, any additional events related to the provided journey ID. For example, the application may be in the process of being approved, or additional information may have been requested via mail, which has been unreturned by the applicant. The journey API 322 can thereafter provide the reason for the delay (block 406). In the case of the former, the operator of the device 104 can use the journey API 322, or another micro-application 202, to generate a reminder (block 408) to the individual or division responsible (shown as an application 208*c*) for the next event in the pre-defined routine.

Pre-defined routines can be created (block 410) in one application (e.g., application 208*d*) and require event completion from, or start with events completed in, another application (e.g., application 208*e*), after that other applica-tion has retrieved the created pre-defined routine (e.g., block 412). More particularly, in some embodiments, for example, the application 208*d* for withdrawing money from an account may create a journey for withdrawing funds from an ATM operating the application 208*e*, or the application 208*e* may be an application permitted transferring funds via a mobile application.

BFF applications 312*a*, 312*b*, and 312*c* can be registered or otherwise onboarded with the journey API 322, as shown in blocks 414, 416, 418, for related micro-applications 202. The onboarding process may be as simple as registering for receiving status data from certain pre-defined routines (e.g., the ATM BFF application 312*a* can be registered to be notified of new instances of withdrawal routines), register-ing for events directly (e.g., the employee BFF application 312*b* may register to receive events performed by a user account associated with an employee, regardless of which device 104 the event occurs in), or a combination of both, or some combination which involves more limited sharing (e.g., truncated event notification).

In addition, the journey API 322 can also be directly connected to the tracking application 314 (block 420) to track events through the journey API 322, and to more generally integrate with the enterprise system 106. As alluded to, in example embodiments, the journey API 322 is maintained by the enterprise system 106.

Figure 5C:
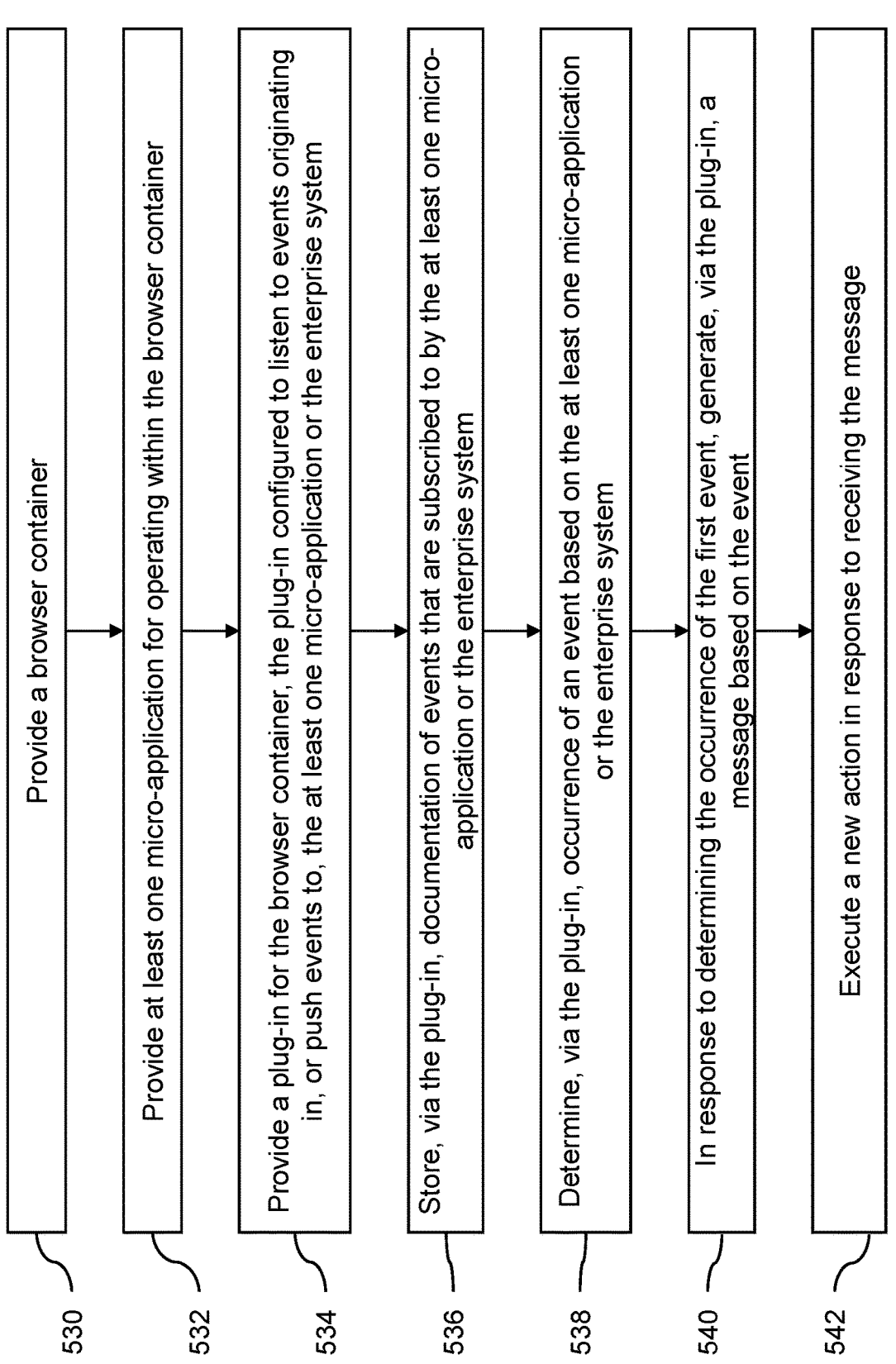

Referring now to FIGS. 5A to 5C, each figure shows a flow diagram of an example method for implementing micro-application environments. To provide illustrative con-text to the methods shown in FIGS. 5A to 5C, reference shall be made to the preceding figures and elements therein. It is understood that the reference to the preceding figures is not intended to be limiting in any way.

FIG. 5A shows a flow diagram for implementing micro-application environments on a single device 104.

At block 502, the browser 206 is provided on the device 104.

At block 504, two or more micro-applications 202 for operating within the browser 206 are provided. For example, the first micro-application 202 can be a micro-application 202 for opening a new bank account, and the second micro-application 202 can be a micro-application for gen-erating notifications of promotions to bank accounts.

At block 506, a plug-in 302 for the browser 206 is provided. The plug-in 302 is configured to listen to events originating in, or push events to the two or more micro-applications 202.

At block 508, documentation of events that each of the two or more micro-applications 202 subscribes to or pub-lishes is stored via the plug-in 302.

At block 510, the plug-in 302 determines the occurrence of an event within, or an event published by one of the two or more micro-applications 202. Determining the event can include receiving notification for publication from a micro-application 202, or listening to an event occurring on a micro-application 202. In example embodiments, determin-ing the event can include receiving an event from an application 208 which is not within the browser 206 but on the device 104 (e.g., copying data from an application 208 operating on the device 104). As will be described herein in relation to other embodiments, the occurrence of the event can be determined by receiving notification of an event from an application 208 which is not within the browser 206 and not occurring on the device 104 (e.g., from the event fabric architecture 310).

At block 512, in response to determining the occurrence of the event, the plug-in 302 generates a message for the micro-application 202 which did not generate the event, where the message is based on the event determined in block 510. For example, the message can simply notify the other micro-application that the published event that was detected. In example embodiments, the message can include the published event and additional information, or can include a subset of the published event, or only certain elements of the published event as designated by configurations defined when a micro-application 202 subscribes to the event. To provide a granular example, the message can include more than the published event by, for example, retrieving the journey ID associated with the event to provide to the subscribing micro-application 202. In another example, the message can include less than the published event, as the micro-application 202 may require only the occurrence of the event or subset of information related thereto to operate (e.g., a micro-application 202 which is used to print a receipt may be excluded from receiving the full payload of a credit card application event to prevent unauthorized use of the full credit card number, etc.). In example embodiments, the message can include additional information not published by the originating micro-application 202 (e.g., the plug-in 302 may append a time stamp).

At block 514, the micro-application 202 executes a new action in response to receiving the message of the event. The message is received by the micro-application 202 directly from the plug-in 302, avoiding the need for back-end infrastructure to complete tasks between micro-applications 202.

To provide yet another example, the event may be the adding of items into a shopping cart of a first micro-application 202. Other micro-applications 202 which are configured to listen to shopping cart based events, such as, for example, a micro-application 202 which generates a draft invoice based on the status of the shopping cart, can be updated based on the event in the first micro-application 202.

A further example of an embodiment described by FIG. 5A is set out below. In the described example, the detected event can be the receiving or entering of new information (e.g., a new bank account application, new credit card application etc.), whether in a micro-application 202 or an application 208 operating on the device 104. The new action can be an updating of another micro-application 202. The new action can include transferring the entered information (e.g., the paste operation of copy-pasting) into the other micro-application 202. In another example, the other micro-application 202 can be the launchpad application 308, and the event can trigger the launchpad application 308 being granted access to enable a third micro-application 202 for tracking application statuses. Access to the third micro-application 202 for tracking application statuses can be restricted without an active application in order to prevent unlikely scenarios of employee abuse, for example.

In this way, events which are independent of the backend may appropriately be performed locally on the device 104. Legacy architectures which bundle back-end event occurrences with events which can occur on a device 104 exclusively undesirably waste resources as a result of such a pairing, and reduce ecosystem flexibility. These monolithic legacy architectures can possibly be replaced with a series of micro-applications 202, which micro-applications 202 can delineate between functions which can be performed solely on the device 104. Unnecessary resource waste (e.g., processing power, bandwidth to communicate and process local events to the back end, etc.) committed to transmitting unnecessary information to the enterprise system 106 can be avoided. The disclosed micro-application environment may be particularly helpful as a result of trends towards cloud computing integration for enterprise systems 106, which as a result of per computing unit pricing can place a greater emphasis on eliminating unnecessary traffic and computing.

Not only can the disclosed environment potentially reduce system-based costs, alluded to above, the environment can provide more efficient and timely use of the local device 104. For example, with the plug-in 302 being used to mediate traffic between micro-applications 202, micro-applications 202 can be kept dormant until the plug-in 302 notifies a micro-application 202 of an occurrence of an event. In this way, local resources may be used solely for active micro-applications 202, to improve performance of the device 104. To provide an example, instead of a device 104 operating a plurality of micro-applications 202, the device 104 may selectively instantiate micro-applications 202 based on the documentation within the plug-in 302 (e.g., micro applications 202 are only instantiated in response to related events or user input). The micro-applications 202 which are not in active use do not drain the device 104 resources to the same extent as an active application, and enable more efficient operation of the device 104 (and potentially also create a more responsive user experience for using the device 104).

Referring now to FIG. 5B, a flow diagram for implementing micro-application environments on multiple devices 104 is shown.

At block 516, the browser 206 is provided on one of the two devices 104.

At block 518, at least one micro-application 202 for operating within the browser 206 is provided.

At block 520, a plug-in 302 for the browser 206 is provided. At least one of the browser 206, the plug-in 302, or the micro-application 202 can facilitate communication with a device 104 other than the device 104 upon which the browser 206 is instantiated. For example, the browser 206 can facilitate the aforementioned communication directly (e.g., via an API native to the browser 206), or indirectly, for example, via communications with the operating system of the device 104 (e.g., where the browser 206 can communicate with the operating system to control a printer device 104). The plug-in 302 is configured at least in part to listen to events originating in the at least one micro-application 202 and intended for the other device 104, or to listen for events from the other device 104.

At block 522, documentation of each of the published events that either of the at least one micro-application 202 and the other device 104 subscribes to or publishes is stored via the plug-in 302. For example, the installation of the other device 104 can include updating the plug-in 302 to ensure that the other device 104 subscribes to events from a controlling micro-application 202, and that the other device 104 can publish events to the plug-in 302.

At block 524, the plug-in 302 determines the occurrence of an event from one or the other of the at least one micro-application 202 and the other device 104. For example, where the other device 104 is, or includes the functionality of a pin pad, the plug-in 302 can be configured to: (1) listen for events to control the pin pad to enable authentication, and (2) listen to events originating from the pin pad (e.g., via integration with the operating system, where the pin pad can communicate with the device operating the browser 206 via, for example, a cable). In another example, the event can be the completion of the process by the at least one micro-application 202, (e.g., a credit card application has been completed).

At block 526, in response to determining the occurrence of the event in block 524, the plug-in 302 generates a message for the micro-application 202 or an application operating on the other device 104 based on the determined event. For example, again referring to the pin pad embodiment, the message can include the pin entered into the pin pad. In another example, the message can include notification of completion of an application, and that printing of same is required (e.g., to comply with regulatory requirements).

At block 528, the micro-application 202 or the other device 104 executes a new action in response to receiving the message of the event. For example, the micro application 202 can authenticate a user with the pin entered into the pin pad. In another example, the other device 104 can print a completed application for execution.

Referring now to FIG. 5C, a flow diagram for implementing micro-application environments including a device 104 and an enterprise system 106 is shown.

At block 530, the browser 206 is provided on the device 104.

At block 532, at least one micro-application 202 for operating within the browser 206 is provided.

At block 534, a plug-in 302 for the browser 206 is provided. At least one of the browser 206, the plug-in 302, or the micro-application 202 can facilitate communication with a device 104 of the enterprise system 106 other than the device 104 upon which the browser 206 is instantiated. For example, the browser 206 can facilitate the aforementioned communication directly (e.g., via an API native to the browser 206 for communicating via the network 110), or indirectly, for example, via communications with, for example, a server of a branch of a retail banking location, or the event fabric architecture 310, etc. The plug-in 302 is configured at least in part to listen to events originating in the at least one micro-application 202 and intended for the enterprise system 106 (e.g., via the event fabric architecture 310), or to push detected events from the enterprise system 106 (e.g., via the event fabric architecture 310) to the at least one micro-application 202.

At block 536, documentation of each of the published events that either of the at least one micro-application 202 and the enterprise system 106 subscribes to or publishes is stored via the plug-in 302. For example, the companion BFF application 312 of a launchpad application 308 can be used to configure the plug-in 302 to listen to events from the enterprise system 106 which the user of the launchpad application 308 is authorized to subscribe to. In a granular example, the user can subscribe to events of a particular pre-defined routine that may require input from that user (e.g., credit card approval supervisor can register to receive data relating to new credit card applications).

At block 538, the plug-in 302 determines the occurrence of an event from one or the other of the at least one micro-application 202 and the enterprise system 106 (e.g., via the event fabric architecture 310). For example, where the event fabric architecture 310 serves a banking institution (e.g., also referred to as a remote computing environment), and includes functionality that cannot be completed locally on the device 104 (e.g., opening a new bank account, approving a new credit card application, etc.), the plug-in 302 can be configured to: (1) listen for events from the event fabric architecture 310, and (2) listen to events from the micro-application 202 to which the event fabric architecture 310 is subscribed.

At block 540, in response to determining the occurrence of the event in block 538, the plug-in 302 generates a message for either the micro-application 202 or the event fabric architecture 310 based on the determined event. For example, again referring to the example opening of a new bank account, the message can include the data entered locally on a device 104 operated by an employee in a bank branch (e.g., address data, employment data, etc.). In another example, where the event is an occurrence determined from the event fabric architecture 310, (e.g., identifying that additional information is needed to complete an application, or that the application process is complete, etc.), the message can include information related to the event fabric architecture 310 event. For example, the message based on the event fabric architecture 310 event can include a payload identifying new information that is required to complete an application (e.g., where additional safety measures are required based on a determination of an elevated likelihood of fraud). In another example, the message based on the event fabric architecture 310 event can be a new configuration for a micro-application 202, or the plug-in 310. In this way, the enterprise system 106 can update all instances of the micro-application 202 by relying upon the data access policies which are already implemented as a result of subscription control.

At block 542, the micro-application 202 or the enterprise system 106 executes a new action in response to receiving the message of the event. For example, the micro-application 202 can generate a new notification on the device 104 identifying the need for more information to complete the application. The user of the device 104 can share this information with the applicant. In another example, the enterprise system 106 can update a central repository in response to receiving a message from the plug-in 302 of an event including an existing customer applying to open a new bank account.

A further example of an embodiment described by FIG. 5C is set out below. In the described example, the detected event can be the receiving or entering of new information (e.g., a new bank account application, new credit card application etc.). The new action can be an updating of an application 208 on a back-end server of the enterprise 106 which also utilizes the newly received information. For example, the other application 208 can be an application which manages a mobile application, and the entered information can be used to update the mobile application.

In any of FIGS. 5A to 5C, the plug-in 302, or the browser 206 can be configured to transmit the occurrence of an event to the enterprise system 106 based on one or more enterprise configurations. The enterprise configurations can be registered with the plug-in 302, for example, during installation, or periodically updated as separate events themselves (e.g., a micro-application 202 for updating the plug-in 302 can be subscribed to events originating from certain applications of the enterprise system 106 for updating the plug-in 302).

The enterprise configuration can be based on at least one of a time of day (e.g., events can be scheduled to be transmitted overnight, so as not to overload the enterprise system 106 during the day), a utilization of the device 104 upon which the browser 206 is operating (e.g., the transmissions can be scheduled so as not to impact the operation of the device 104 in real-time), the sensitivity of the new action (e.g., where new actions are time sensitive, the enterprise configuration can require the transmission of the event immediately. For example, the new event can be the opening of a bank account, to which a customer would want immediate access), a connection status (e.g., the device 104 can be configured to only transmit events via a known secure network, across certain connections, e.g., avoiding wireless networks, avoiding intermittent or poor connection quality transmissions so as not to generate duplicate messages, etc.) a protocol, etc.

In respect to FIG. 5A, and other example embodiments, transmissions to the enterprise system 106 can occur subsequent to the transmitting of the message to the other micro-application 202 for completion of the new action. In this way, enterprise system 106 can be kept appraised of events occurring on the device 104 with relatively little impact on the operation of the device 104 generally, and no impact during performing the action.

In any of FIGS. 5A to 5C, the plug-in 302 can be configured to execute a notification based on the new action. In example embodiments, the completion of new action by the micro-application 202 is an event to which the plug-in 302 subscribes to in order to generate a notification. The plug-in 302 can utilize infrastructure of the browser 206 to place the notification external to the browser 206. For example, the plug-in 302 can implement notifications via the operating system based on the APIs contained within the browser 206 for interacting with the operating system. In this way, the micro application environment can utilize the ubiquity of the browser 206, and the browser 206 efforts to maintain the interconnectivity of the browser 206, to generate notifications across a plurality of systems, including certain legacy systems.

More generally, in any of FIGS. 5A to 5C, the new action can be executed by at least in part communication with an application 208 via an API native to the browser 206 and accessible to the plug-in 302.

FIG. 6 is a flow diagram of an example method for initiating a browser container with a plug-in for mediating between micro-applications. To provide illustrative context to the method shown in FIG. 6, reference shall be made to the preceding figures and elements therein. It is understood that the reference to the preceding figures is not intended to be limiting in any way.

At block 602, similar block 502, a browser 206 is provided.

At block 604, a gatekeeper application (e.g., the launchpad application 308) for operating micro applications within the browser 206 is executed. The gatekeeper application can be used to enforce a configuration on subsequent micro-applications 202 operating within the browser 206, or on the browser 206 itself. For example, the gatekeeper application can specify which micro-applications 202 can operate within the instance of the browser 206, what type of messages a micro-application 202 can publish or subscribe to, operating hours, etc.

At block 606, based on the configuration of the gatekeeper application, the plug-in 302 for the browser 206 is provided. As alluded to above, the plug-in 302 can be configured to only serve certain micro-applications 202 (e.g., APIs required for the plug-in 302 to operate certain micro-applications 202 can be prevented from operating, or can actively not be loaded), or to restrict the publication or the transmission of any events, etc.

At block 608, documentation of events which are subscribed to or published by micro-applications 202 operating within the browser 206 are provided to the plug-in 302. For example, the plug-in 302 may be configured based on historical or previous use associated with the credentials used to log into the gatekeeper application. As a result, the plug-in 302 may only be configured with documentations of events based on previously granted permissions, and can be used across devices 104 while maintaining a certain level of security.

At block 610, based on the gatekeeper application, at least one micro-application 202 is enabled for operating within the browser 206. In example embodiments, enabling can include the downloading and installation of the relevant micro-application 202. In at least some contemplated example embodiments, the relevant micro-applications 202 already exist on the device 104, or within the browser 206, or as part of the gatekeeper application, and are activated or permitted to operate within the browser 206.

In example embodiments, the gatekeeper application or the plug-in 302 can receive a request to register new micro-application 202 for use with the plug-in 302 or browser 206, generally, or in relation to a specific instance thereof. For example, a plurality of new micro-applications 202 can be registered for use with the plug-in 302 to replace the function of certain legacy systems.

The new micro-application 202 can be registered to the plug-in 302 based on whether the new micro-application 202 complies with criteria defining maximum allowable dependencies. As the micro application environment is intended to be robust and scalable, any new micro-application 202 for the micro application environment can be rejected based on whether it introduces unnecessary dependency, fosters undesired interconnections between micro-applications 202, etc. To provide a granular example, the maximum allowable dependency can be based on which JavaScript™ libraries are required to implement the micro-application 202, the number of calls to other micro-applications 202 (if any) required to implement the new micro-application 202, storage requirements of the new micro-application 202 (e.g., micro-applications 202 that are too resource intensive to be completed by a legacy device 104 may be rejected), etc.

In response to the new micro-application 202 being accepted for registration with the plug-in 302, the documentation (block 608) may be updated to store (1) events the new micro-application 202 subscribes to, and (2) definitions of events the new micro-application 202 will publish. In this way, the new micro-application 202 can be integrated into the micro application environment relatively simply, by updating the documentation. Subsequently, other micro-applications 202 can subscribe to events published by the new micro-application 202, for example, based on new pre-defined routines that incorporate the new micro-application 202.

At block 612, the plug-in 302 detects an event as a result of the operation of at least one of the enabled at least one micro-application 202. In response to detecting the event, the plug-in 302 generates and transmits a message based on the detected event.

At block 614, a new action is executed in response to the transmission or receipt of the message generated in block 612. In example embodiments, the new action is performed by another of the at least one micro-applications 202 running in the browser 206. In another example, the new action is performed by a backend server device 104 of the enterprise system 106.

FIG. 7 is a flow diagram of an example method for implementing micro-application environments with pre-defined configurations.

At block 702, and new pre-defined routine is received. The pre-defined routine can specify a sequence of one or more events (e.g., credit card application), or one or more events independent of the sequence that must occur for the pre-defined routine to be completed (e.g., a series of payment to satisfy an outstanding loan).

At block 704, subscriptions are made in the plug-in 302 to receive notifications o the one or more events which define the pre-defined routine of block 702 occur within the browser 206. In example embodiments, the subscriptions can be made to each instance of the plug-in 302 which has enabled thereon micro-applications 202 required for the pre-defined routine. For example, the launchpad application 308 can configure each instance of the plug-in 302 to transmit messages of events that define the pre-defined routine to the journey API 322. More generally, the plug-in 302 can be configured to transmit messages of the events that define a pre-defined routine to update any custodian or other application tracking the pre-defined routine (e.g., via the tracking application 314).

At block 706, in response to detecting the occurrence of any of the one or more events that define the pre-defined routine, the journey API 322 can generate a new instance of the pre-defined routine. For clarity, configuration of a pre-defined routine can include defining the requisite events (e.g., steps required for opening a new bank account), whereas a new instance of the pre-defined routine can be a specific instance of the pre-defined routine type (e.g., John Doe's application to open a new bank account).

In example embodiments, upon detecting the occurrence of an event which is included in a pre-defined routine, a new instance of the pre-defined routine is created and updated with the occurrence of the event which triggered the new pre-defined routine instance.

At block 708, the instance of the pre-defined routine is updated to reflect the occurrence of events of the pre-defined routine. In example embodiments, the journey API 322 determines occurrence of these events via the applications responsible for the events (e.g., by listening to, or being configured to receive notifications pushed from, applications 208 or micro-applications 202 responsible for the events), or via the plug-in 302, etc.

The block 710, the updated status of the new instance of the pre-defined routine is provided in response to requests related to the pre-defined routine. As discussed herein, a pre-defined routine can be updated and catalogued based on a journey ID.

Figure 8:
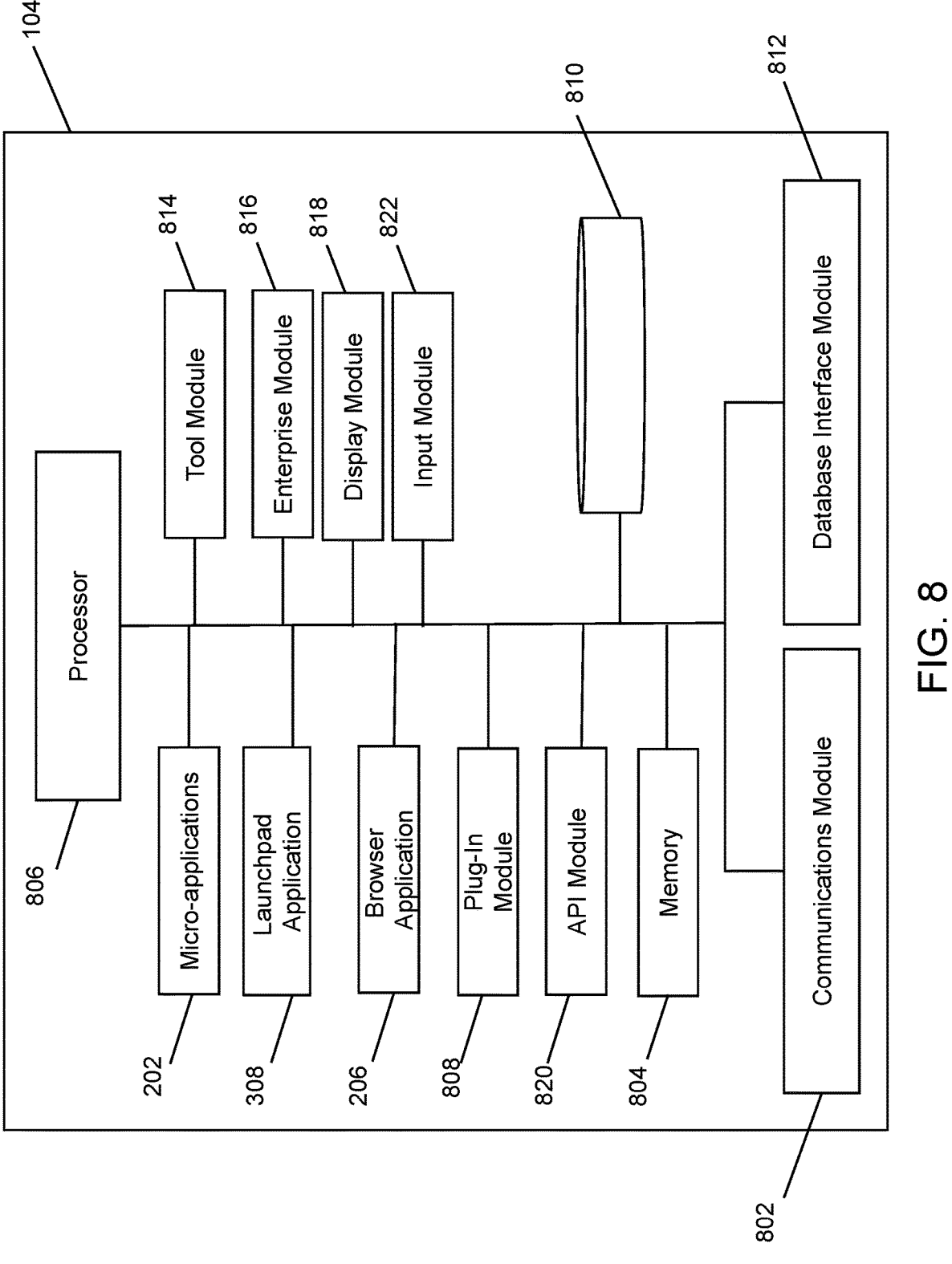
FIG. 8 is a block diagram of an example device.

Referring now to FIG. 8, an example configuration of a device 104 for implementing micro-application environments as described herein is shown. The device 104 includes a communications module 802 that enables the device 104 to communicate with one or more other components of the computing environment 102, such as the enterprise system 106, or the other devices 104 (e.g., device 104*bb*), etc., via a bus or other communication network, such as the communication network 110. The device 104 includes at least one memory 804 or memory device that can include a tangible and non-transitory computer-readable medium having stored therein computer programs, sets of instructions, code, or data to be executed by one or more processors.

In the example embodiment shown in FIG. 8, the device 104 includes one or more processors 806 to implement the browser 206, the plug in 302 (e.g., via plug-in module 808), or the micro-applications 202, etc. Exemplary processors 806 can be purpose specific, for example to execute modules or applications, include a browser 206, operations to manipulate the data, and so forth. Although not shown in FIG. 8, as noted above, the device 104 may also include a cryptographic server for performing cryptographic operations and providing cryptographic services. The cryptographic server can also be configured to communicate and operate with a cryptographic infrastructure. The device 104 may also include one or more data storage elements for storing and providing data for use in such services, such as data storage 810, or a database interface module 812 for connecting to data storage elements remote to the device 104 (e.g., where the data 14 is stored in a distributed fashion). The data store 810 may be used to store device 104 data, such as, but not limited to, an IP address or a MAC address that uniquely identifies the device 104. The data store 810 may also include a data catalog (not shown) storing configurations of the applications (e.g., the launchpad application) and other data, such as, but not limited to, login credentials, user preferences, cryptographic data (e.g., cryptographic keys), etc.

The device 104 can include a tool module 814, for executing, for example, tool 8A, an application programming interface (API) module 820, for facilitating communication with other elements in the computing environment 102, and an enterprise specific interface module 816 which can be configured by the enterprise system 106.

The device 104 can include a display module 818 for rendering GUIs and other visual outputs on a display device such as a display screen, and an input module 822 for processing user or other inputs received at the device 104 e.g., via a touchscreen, input button, transceiver, microphone, keyboard, etc.

It can be appreciated that any of the components shown in FIG. 8 may also be hosted externally and be available to the remote computing environment 108, e.g., via the communications module 802.

It will be appreciated that only certain modules, applications, tools, and engines are shown in FIGS. 1-4, and 8, for ease of illustration. Various other components can be provided and utilized by, for example, the enterprise system 106 or the remote computing resources 108, as is known in the art.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of any of the servers or other devices in the computing environment 102, enterprise system 106 or devices 104*a*, 4*aa*, etc., or accessible or connectable thereto. Any application or module herein described may be implemented using computer readable/executable instructions that may be stored or otherwise held by such computer readable media.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A computer system for implementing micro-application environments, the system comprising:
   a processor;
   a memory coupled to the processor, the memory storing computer executable instructions that when executed by the processor cause the system to:
   provide a computer browser application to act as a browser container;
      interface at least one micro-application to the browser application to enable operability within the browser container;
      provide a plug-in for the browser container, the plug-in configured to detect events originating in, or push events to, the at least one micro-application operating with the browser container:
      store, via the plug-in, documentation of events that each of the at least one micro-application subscribes to;
      determine, via the plug-in, occurrence of a first event, the first event being subscribed to by the at least one micro-application;
      in response to determining the occurrence of the first event, generate, via the plug-in, a message to the at least one micro-application based on the event;
      execute, via the at least one micro-application, a new action in response to receiving the message; and
      process, via the plug-in, requests to register a new micro-application as one of the at least one micro-applications by:
         updating the documentation to store (1) events the new micro-application subscribes to, and (2) definitions of events the new micro-application will publish; and
         wherein the plug-in processes requests to register based on whether the new micro-application complies with criteria defining maximum allowable dependencies.

2. The system of claim 1, wherein the at least one micro-application includes a first micro-application and a second micro-application, the first event occurs as a result of operation of the first micro-application, and the message is transmitted to the second micro-application to execute the new action.

3. The system of claim 2, wherein the second micro-application is inactive prior to the new action being executed.

4. The system of claim 2, wherein the instructions further cause the processor to:
   transmit, based on an enterprise configuration, occurrence of at least one of the first event or the new action to an enterprise system subsequent to transmitting the message to the at least one micro-application.

5. The system of claim 4, wherein the enterprise configuration is based on at least one of a time of day, a utilization of the system, a sensitivity of the new action, a connection status, and a protocol.

6. The system of claim 1, wherein the first event occurs in a remote computing system, and the plug-in detects the first event at least in part by subscribing to an event based architecture implemented on the remote computing system.

7. The system of claim 6, wherein the event based architecture is registered to receive, and the plug-in publishes to the event based architecture, events generated by the at least one micro-application.

8. The system of claim 1, wherein the first event is receiving new information, and the new action is updating existing records to reflect the received new information.

9. The system of claim 1, wherein the instructions further cause the processor to:
   execute, via the plug-in, a notification based on the first event or the new action, the plug-in utilizing infrastructure of the browser container to place the notification external to the browser container.

10. The system of claim 1, wherein the instructions further cause the processor to:
   transmit, via the plug-in, occurrence of the first event to a remote computing system;
   in response, receive from the remote computing system, via the plug-in, at least one record related to the first event; and
   include the at least one record related to the first event in the message for executing the new action.

11. The system of claim 10, wherein executing the new action at least in part comprises communicating with an application external to the browser container via a native application application programming interface (API) accessible to the plug-in.

12. A method for implementing micro-application environments, the method being executed by a computer system and comprising:
   providing a computer browser application to act as a browser container;
   interfacing at least one micro-application to the browser application to enable operability within the browser container;
   providing a plug-in for the browser container, the plug-in configured to detect events originating in, or push events to, the at least one micro-application operating with the browser container;
   storing, via the plug-in, documentation of events that each of the at least one micro- application subscribes to;
   determining, via the plug-in, occurrence of a first event, the first event being subscribed to by the at least one micro-application;
   in response to determining the occurrence of the first event, generating, via the plug-in, a message to the at least one micro-application based on the event;
   executing, via the at least one micro-application, a new action in response to receiving the message; and
   processing, via the plug-in, requests to register a new micro-application as one of the at least one micro-applications by:
   updating the documentation to store (1) events the new micro-application subscribes to, and (2) events the new micro-application will publish; and
   wherein the plug-in processes requests to register based on whether the new-micro- application complies with criteria defining maximum allowable application dependency.

13. The method of claim 12, wherein the at least one micro- application includes a first micro-application and a second micro-application, the first event occurs as a result of operation of the first micro-application, and wherein the method further comprises transmitting the message to the second micro-application, to execute the new action.

14. The method of claim 13, wherein the second micro-application is inactive prior to the new action being executed.

15. The method of claim 13, further comprising:

transmitting, based on an enterprise configuration, occurrence of at least one of the first event or the new action to an enterprise system subsequent to execution of the new action.

16. The method of claim 12, the method comprising:

in response to determining the first event is associated with a pre-defined routine, retrieving at least one record related to the pre-defined routine;

including the at least one record related to the first event in the message for executing the new action.

17. The method of claim 16, wherein at least one of the pre-defined routine and the at least one related record are stored on a remote computing system.

18. A non-transitory computer readable medium for implementing micro- application environments, the computer readable medium comprising computer executable instructions executed by a processor of a computer system for:

providing a computer browser application to act as a browser container;

interfacing at least one micro-application to the browser application to enable operability within the browser container;

providing a plug-in for the browser container, the plug-in configured to detect events originating in, or push events to, the at least one micro-application operating with the browser container;

storing, via the plug-in, documentation of events that each of the at least one micro-application subscribes to;

determining, via the plug-in, occurrence of a first event, the first event being subscribed to by the at least one micro-application;

in response to determining the occurrence of the first event, generating, via the plug-in, a message to the at least one micro-application based on the event;

executing, via the at least one micro-application, a new action in response to receiving the message; and processing, via the plug-in, requests to register a new micro-application as one of the at least one micro-applications by:

updating the documentation to store (1) events the new micro-application subscribes to, and (2) events the new micro-application will publish; and wherein the plug-in processes requests to register based on whether the new-micro-application complies with criteria defining maximum allowable application dependency.

19. The non-transitory computer readable medium of claim 18, wherein the at least one micro-application includes a first micro-application and a second micro-application, the first event occurs as a result of operation of the first micro-application, and wherein the method further comprises transmitting the message to the second micro-application, to execute the new action.

20. The non-transitory computer readable medium of claim 19, wherein the second micro-application is inactive prior to the new action being executed.

\* \* \* \* \*